United States Patent [19]

Yamamoto et al.

[11] Patent Number: 5,642,925
[45] Date of Patent: Jul. 1, 1997

[54] FILM CARRIER AND PROJECTION APPARATUS

[75] Inventors: Yasuhiro Yamamoto, Yokohama; Toshio Iwaya, Shiki, both of Japan

[73] Assignee: Canon Kabushiki Kaisha, Tokyo, Japan

[21] Appl. No.: 502,064

[22] Filed: Jul. 14, 1995

[30] Foreign Application Priority Data

| Jul. 22, 1994 | [JP] | Japan | 6-192217 |
| Aug. 1, 1994 | [JP] | Japan | 6-198993 |
| Oct. 17, 1994 | [JP] | Japan | 6-277071 |
| Oct. 17, 1994 | [JP] | Japan | 6-277073 |

[51] Int. Cl.$^6$ ............................................. G03B 21/11
[52] U.S. Cl. .................. 353/25; 353/26 R; 353/27 R; 353/DIG. 2
[58] Field of Search ............................ 353/25, 26 R, 353/27 R, 22, 23, DIG. 2, 95; 355/75

[56] References Cited

U.S. PATENT DOCUMENTS

| 3,806,235 | 4/1974 | Wangerin | 353/26 R |
| 4,149,784 | 4/1979 | Johnson et al. | 353/23 |
| 5,223,890 | 6/1993 | Sakakibara et al. | 355/75 |

FOREIGN PATENT DOCUMENTS

| 57-163223 | 10/1982 | Japan . | |
| 4125623 | 4/1992 | Japan | 353/26 R |

*Primary Examiner*—William Dowling
*Attorney, Agent, or Firm*—Fitzpatrick, Cella, Harper & Scinto

[57] ABSTRACT

A film carrier is provided with a roll carrier for supporting a roll film and a sheet carrier for supporting a sheet film, and is arranged to use either one of the carriers as selectively positioning it in a projection optical path. In the film carrier, the sheet carrier is moved to a first retracting position not to interfere with the roll carrier outside the projection optical path when the roll carrier is located on the projection optical path. In contrast, the roll carrier is moved to a second retracting position not to interfere with the sheet carrier outside the projection optical path when the sheet carrier is located on the projection optical path. The sheet carrier and the roll carrier at the first and second retracting positions are arranged so that at least parts thereof overlap vertically.

32 Claims, 23 Drawing Sheets

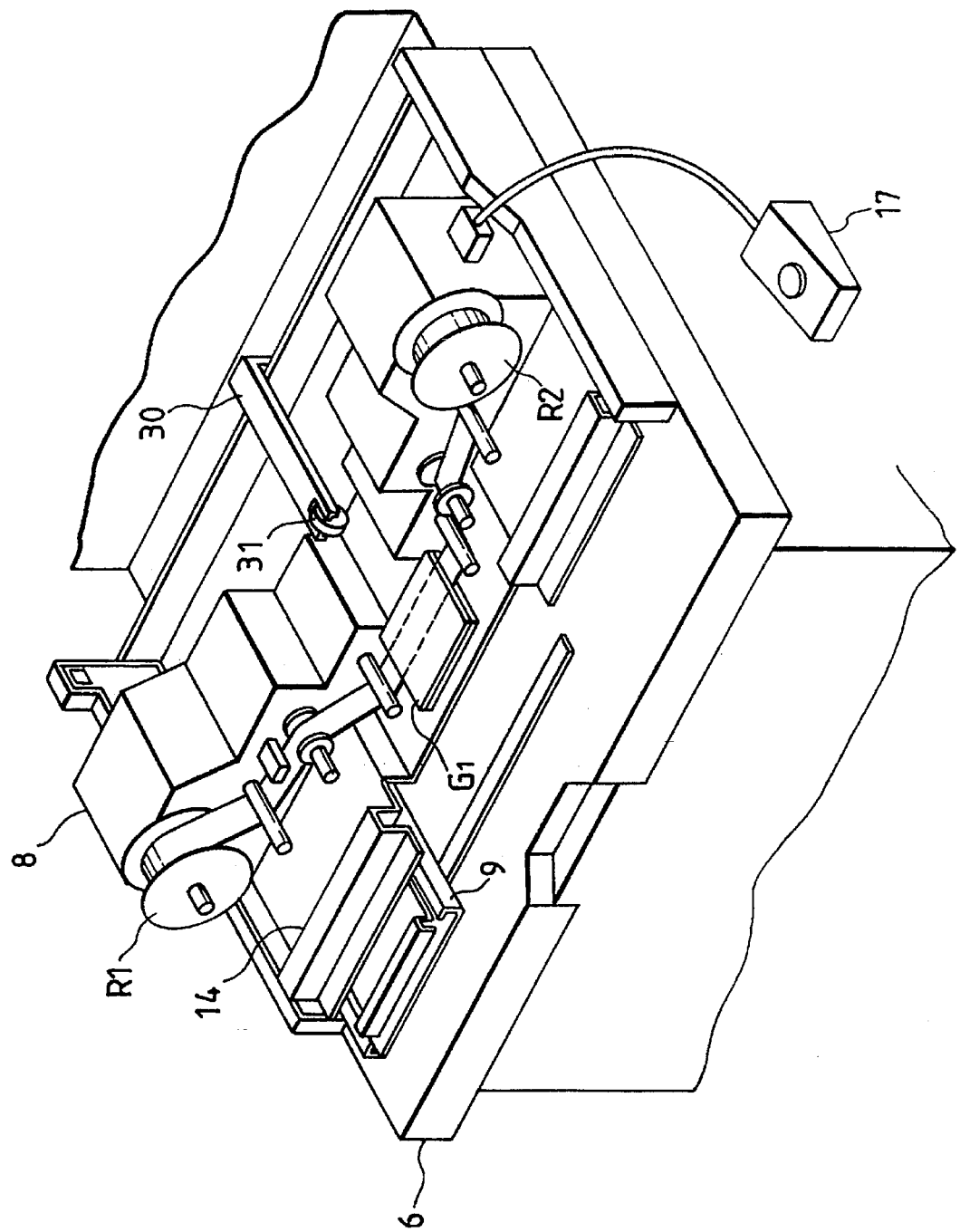

FILM CARRIER AND PROJECTION APPARATUS

BACKGROUND OF THE INVENTION

1. Field of the Invention

The present invention relates to a reader-printer for projecting or printing an image, for example, of a microfilm, and more particularly to a film carrier for a reader-printer that enables the reader-printer to project images of roll film and fiche film.

2. Related Background Art

There are readers for projecting images recorded in a microfilm to a screen and reader-printers having a function to print the recorded images in addition to the function to project the recorded images. Types of microfilms used in image projecting apparatus such as the readers and the reader-printers are classified into roll films, which are roll-type films such as open-reel films, and sheet films, which are sheet-type films such as microfiches and aperture cards.

There are conventional devices for allowing projection of these two types of films.

An example employs a carrier for roll film (hereinafter referred to as a roll carrier) and a carrier for sheet film (hereinafter referred to as a sheet carrier) separate from each other, and either one of them is set at a projection position.

In this example, the roll carrier and sheet carrier cannot be simultaneously set in the projection apparatus, which forces an operator to perform a mounting and dismounting or exchanging operation of carriers to the projection apparatus, resulting in necessitating time and labor.

The bulletin of Japanese Laid-open Patent Application No. 57-163223 discloses the film carrier that permits either type of microfilm, both the roll film and the microfiche, to be used. In the conventional microfilm carrier as disclosed in the bulletin, a carrier plate movable in right-and-left directions is mounted on a movable carrier movable in front-and-back directions relative to the main body of the image projection apparatus such as the reader, and a carrier glass for microfiche and a carrier glass for roll film are unitarily mounted on the carrier plate.

Since the above conventional microfilm carrier is so arranged that the two carrier glasses are shifted back and forth on the carrier plate so as to move together with the carrier plate, the film carrier becomes large in the front-and-back directions, which necessitates forming a carrier moving portion of a large area in the front-and-back directions and also necessitates securing a large space for movement of the carrier moving portion, resulting in making operability poor. Further, because the portion for holding the roll film is located this side of the carrier glass for microfiche, the portion for holding the roll film obstructs loading the microfiche or manipulating the carrier glass for microfiche.

Also, U.S. Pat. No. 5,223,890 discloses such an arrangement that the roll carrier and the sheet carrier are unitarily moved in the right-and-left directions to permit use of the roll film and the microfiche film, but it necessitates the carrier moving portion of a large area in the right-and-left directions and the carriers become large and heavy, which makes a size reduction difficult and the operability poor.

In addition, for using the microfiche film, the roll film on the roll carrier needs to be removed, which requires time and labor. Further, if one desires to project the roll film from the state of projecting the microfiche film, the sheet carrier needs to be retracted out of the optical path and then the roll film needs to be loaded on the roll carrier, which also requires time and labor. In other words, it is impossible to project the roll film and the microfiche film as readily changing over between them.

Further, if the operator moved the roll carrier while the roll film was loaded on the roll carrier, there were problems that the roll film was damaged and that components of the carrier were broken.

SUMMARY OF THE INVENTION

The present invention has been accomplished to solve the above problems in the conventional techniques, and an object of the present invention is to decrease the sizes of the film carrier and projection apparatus and to provide a film carrier and projection apparatus enabling projection with easy change between the roll film and the sheet film.

To achieve the above object, the present invention is characterized in that there are provided two carriers, a roll film carrier for supporting a roll film and a sheet film carrier for supporting a sheet film, either one of the carriers is selectively located in a projection optical path, the sheet film carrier is moved to a first retracting position located outside the projection optical path and not interfering with the roll film carrier when the roll film carrier is located on the projection optical path, the roll film carrier is moved to a second retracting position located outside the projection optical path and not interfering with the sheet film carrier when the sheet film carrier is located on the projection optical path, and the sheet film carrier and the roll film carrier at the first and second retracting positions are arranged so that at least parts thereof overlap up and down.

The roll film carrier is moved in a direction perpendicular to a transfer direction of the roll film so as to be located at the second retracting position, and the sheet film carrier is moved in the transfer direction of the roll film so as to be located at the first retracting position.

In the film carrier arranged in the above structure, the roll film carrier and sheet film carrier each can be retracted to their retracting positions outside the projection optical path, where they are arranged as overlapping up and down, which can decrease the plane size of the film carrier body.

BRIEF DESCRIPTION OF THE DRAWINGS

FIGS. 6A and 6B are front views of the film carrier, wherein FIG. 6A shows a state in which the roll carrier is used and FIG. 6B shows a state in which the sheet carrier is used;

FIGS. 7A and 7B are schematic side views of the film carrier, wherein FIG. 7A shows a state in which the roll carrier is used and FIG. 7B shows a state in which the sheet carrier is used;

FIGS. 13A and 13B are schematic side views of the film carrier, wherein FIG. 13A shows a state in which the roll carrier is used and FIG. 13B shows a state in which the sheet carrier is used;

FIG. 14 is a perspective view of appearance to show a state in which the roll carrier in the film carrier of the third embodiment is used;

DETAILED DESCRIPTION OF THE PREFERRED EMBODIMENTS

The present invention will be described based on the embodiments as illustrated.

Figure 1:
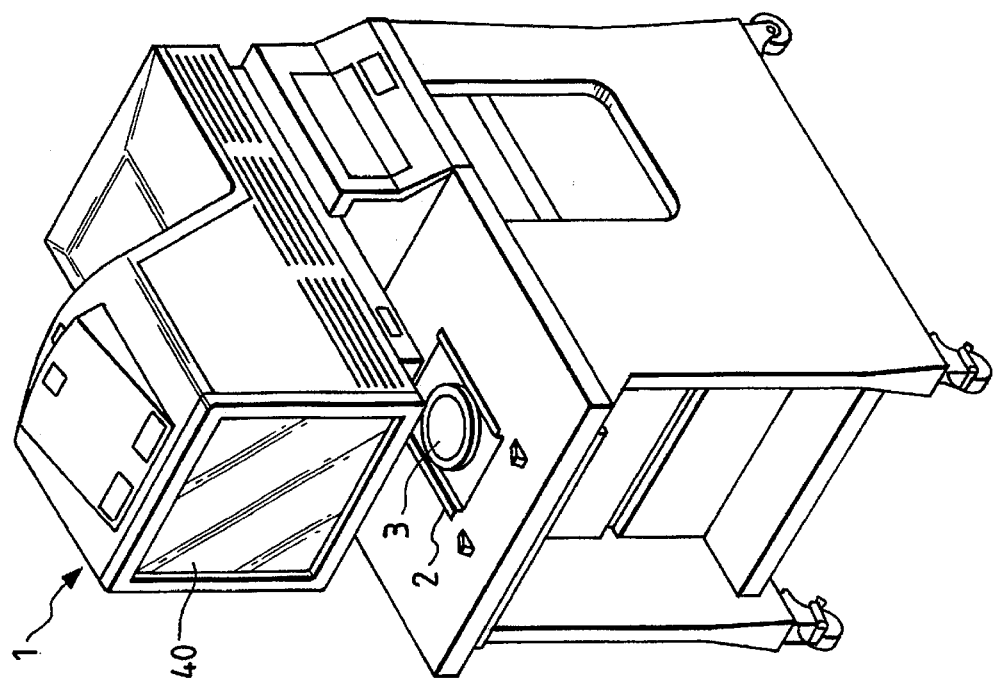
FIG. 1 is a perspective view of appearance to show a state in which the film carrier is mounted on the reader-printer as a projection apparatus according to the present invention.

FIG. 1 is a perspective view of appearance to show a reader-printer 1 as a projection apparatus and as an image forming apparatus, on which a film carrier of the present invention is mounted.

Figure 2:
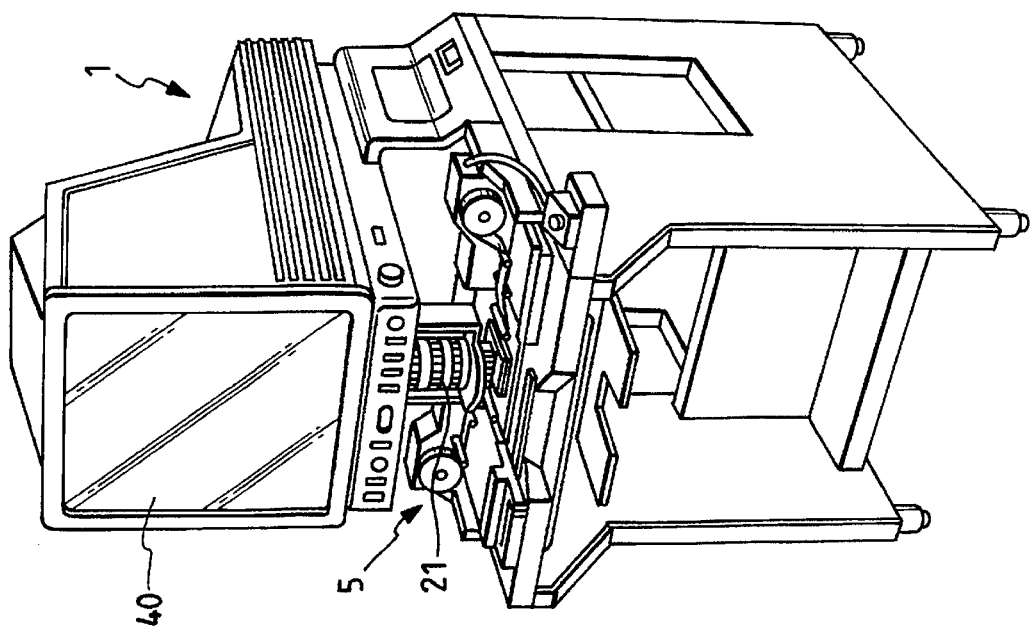
FIG. 2 is a perspective view of appearance to show a state in which the film carrier is removed.

FIG. 2 is a perspective view of appearance to show the reader-printer 1 from which the film carrier 5 is removed.

In FIG. 1 and FIG. 2, a projection lens (projection means) 21 is located above the projection position of film carrier 5, and a film illumination light source and a condenser lens 3 are set below the projection position, whereby a projection image can be projected as an enlarged image to a screen 40.

Also, mount rails 2 are provided on either side of the condenser lens 3, and the film carrier 5 is introduced along the mount rails 2 to be mounted.

Figure 3:
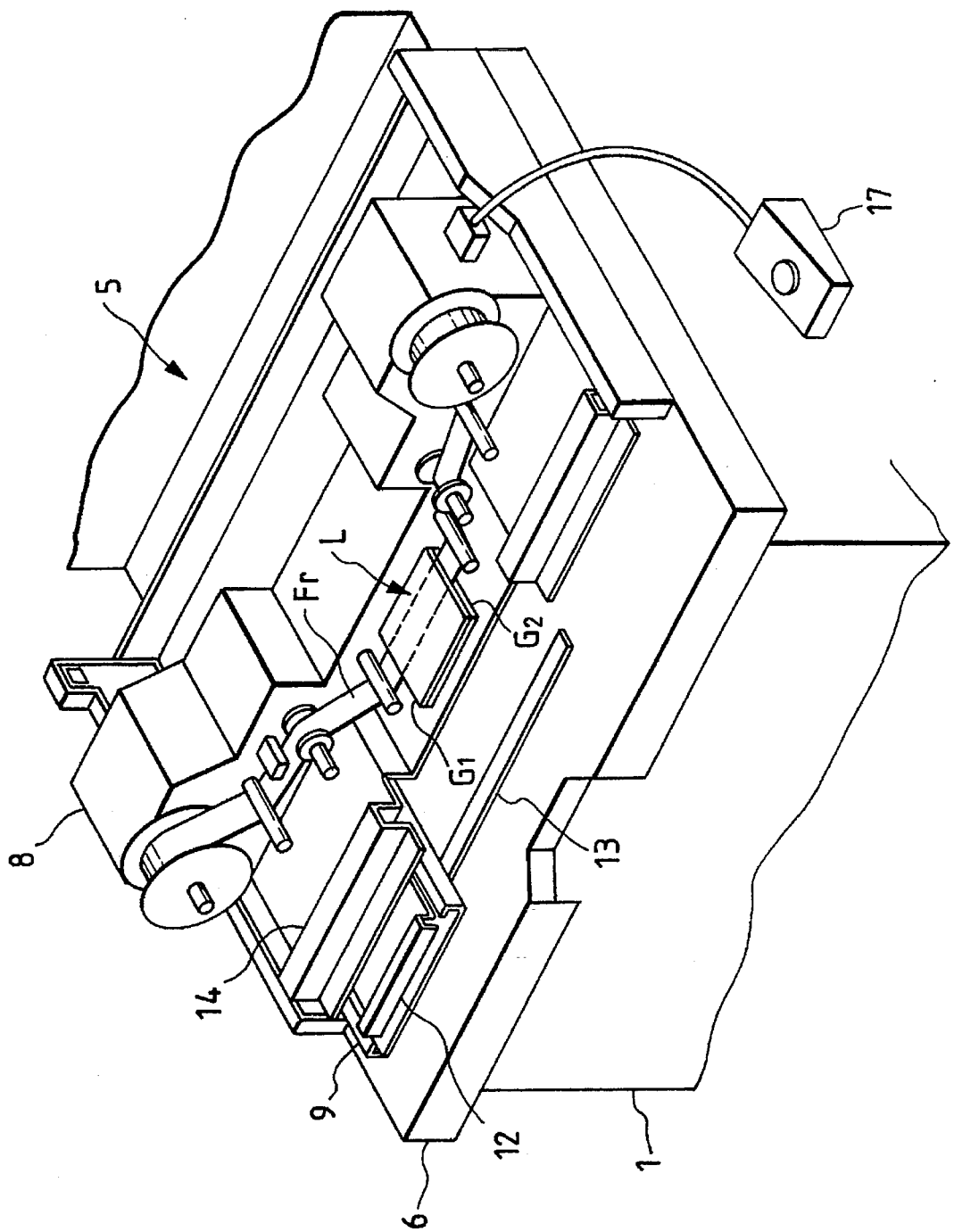
FIG. 3 is a perspective view of appearance to show a state that the roll carrier in the film carrier is used.
Figure 4:
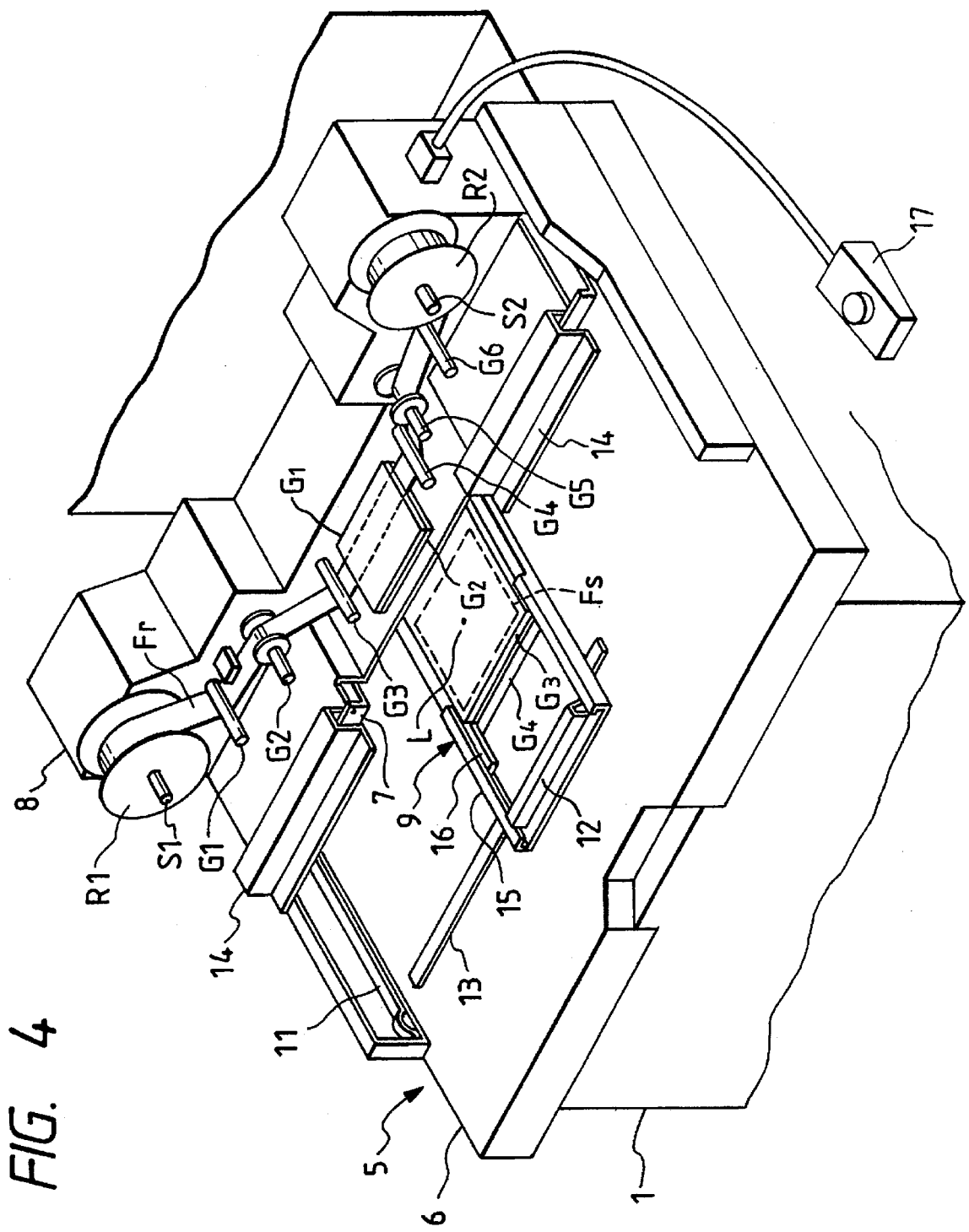
FIG. 4 is a perspective view of appearance to show a state in which the sheet carrier in the film carrier is used.

FIG. 3 and FIG. 4 are drawings to show the film carrier 5 mounted on the reader-printer 1, in which the film carrier 5 is comprised of a base stage 6, a roll carrier base (base plate) 7, a roll carrier (first moving member) 8, and a sheet carrier (second moving member) 9 and in which the base stage 6 is introduced along the mount rails 2 in the reader-printer 1 to be fixed at a specified position shown in FIG. 3 and FIG. 4. The base stage 6 has an aperture through which illumination light from the condenser lens 3 passes, and the aperture is formed at a position opposed to the condenser lens 3 when the base stage 6 is set at the specified position. The roll carrier 8 is comprised of a transfer path for transferring the roll film Fr, and glasses $G_1$, $G_2$ as transparent plates for holding the roll film Fr between them, and is arranged to move in front-and-back directions relative to the roll carrier base 7 when the operator captures and manipulates a grip 14. When the roll carrier 8 is pushed over a moving range to the roll carrier base 7, the roll carrier base 7 moves as rollers 10 provided on side faces thereof move along rails 11 provided on the base stage 6, whereby the roller carrier base 7 moves together with the roll carrier 8 in the front-and-back directions. In case of backward movement, they are lifted up along the rails 11.

The sheet carrier 9 is comprised of a right-and-left moving frame 15 arranged to move in the right-and-left directions along rails 13 when a grip 12 is manipulated, and a front-and-back moving frame 16 arranged to move in the front-and-back directions relative to the right-and-left moving frame 15, and the front-and-back moving frame 16 is provided with glasses $G_3$, $G_4$ for holding a sheet film Fs between them.

FIG. 3 is a drawing to show a state in which the roll carrier 8 is used, that is, a state in which the roll carrier is located at a use position for projecting the roll film: in order to bring the roll film Fr onto the projection optical path L of reader-printer 1 (to the position opposed to the light passing aperture of the base stage 6), the sheet carrier 9 is moved to the left end and the roll carrier 8 is pulled to this side, whereby the roll carrier base 7 comes to this side to the utmost in synchronization therewith. A space for retracting the sheet carrier 9 is provided between the roll carrier base 7 and the base stage 6 in this state. When the roll film carrier 8 is further pulled to this side, the roll film carrier 8 further moves to this side on the roll carrier base 7 as keeping the position of the roll carrier base 7 constant. Here, the roll carrier 8 is moved back and forth to adjust the position desired to project in the roll film Fr. After that, a roll film transferring motor provided in the roll carrier 8 is controlled based on a signal from a control unit 17 for transfer of roll film in the roll carrier 8, whereby the roll film Fr is transferred right and left to locate a desired frame on the projection optical path L.

FIG. 4 is a drawing to show a state in which the sheet carrier 9 is used, that is, a state in which the sheet carrier is located at the use position: the roll carrier 8 is moved to that side and in synchronization therewith the roll carrier base 7 moves to that side to be lifted up and then to be located at a retracting position higher than the use position. Lifting the roll carrier base 7 and roll carrier 8 up forms a space, having a height enough for the sheet carrier to move, between the roll carrier base 7 and the base stage 6, and the sheet carrier 9 becomes movable right and left. Then the sheet carrier 9 is moved back and forth and right and left for the sheet film Fs between the transparent glasses $G_3$, $G_4$ to be located on the projection optical path L. The roll carrier 8 and sheet carrier 9 are arranged so that at least parts thereof overlap up and down when placed at their respective retracting positions. Thus, the two carriers are retracted at different height positions, which makes the plane size smaller, resulting in decreasing the size of the film carrier.

The entire roll carrier 8 can be moved including the glasses $G_1$, $G_2$ supporting the roll film Fr and the sheet carrier 9 can also be moved in the same manner together with the glasses $G_3$, $G_4$ supporting the sheet film Fs, whereby the film projected can be readily changed without a need to perform a forced operation of mounting and dismounting the roll film Fr and the sheet film Fs to be located on the projection optical path L, thus improving the operability.

The roll carrier 8 has a supply shaft S1 supporting a supply reel R1, a winding shaft S2 supporting a winding reel R2, film guide rollers G1–G6, and motors for driving the shafts S1, S2, and these components are disposed in the roll carrier 8.

Figure 5:
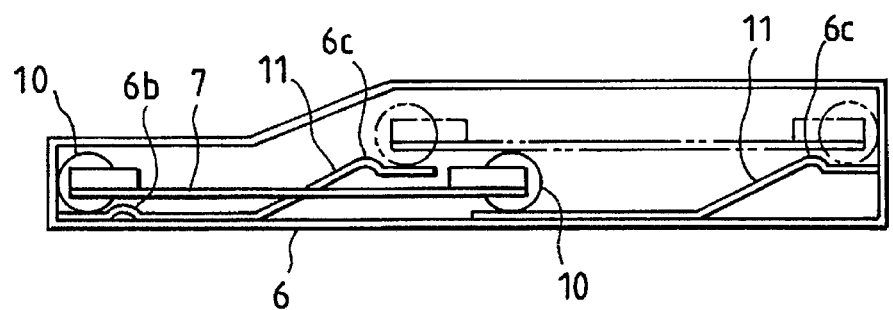
FIG. 5 is a schematic side view to show movement of the roll carrier in the film carrier.

FIG. 5 is a schematic drawing to show a relation of the roll carrier base 7 with the rollers 10 and rails 11, wherein the solid lines represent a state in which the roll carrier base 7 is located at the nearest site (at the use position) and chain double-dashed lines a state in which the roll carrier base 7 is located at the farthest site (at the second retracting position).

Since the roll carrier base 7 moves between the use position where the roll film Fr is placed on the projection optical path L and the second retracting position higher than the use position so as to form the space for movement of the sheet carrier 9 when it is outside the projection optical path in using the sheet carrier 9, the roll carrier base 7 needs to be arranged to move with as small resistance as possible. In the present embodiment, the roll carrier base 7 is arranged as readily movable relative to the base stage 6 by a mechanism such as rolls (rollers 10).

Here is explained a fixing means for fixing relative to the base stage 6 the roll carrier base 7, which permits the roll carrier 8 at the use position to be moved.

When the roll carrier 8 and roll carrier base 7 are located at the use position as shown by the solid lines in FIG. 5, the rollers 10 on the roll carrier base 7 are inhibited from moving by projections (fixing means) 6b provided on the rails 11 on the base stage 6, thus stopping movement of the roll carrier base 7.

When the roll carrier base 7 is located at the second retracting position as shown by the chain double-dashed lines, that is, when the sheet carrier 9 is made usable, projections 6c may be provided on the rails so as to keep the roll carrier 8 stationary.

Figure 6A:
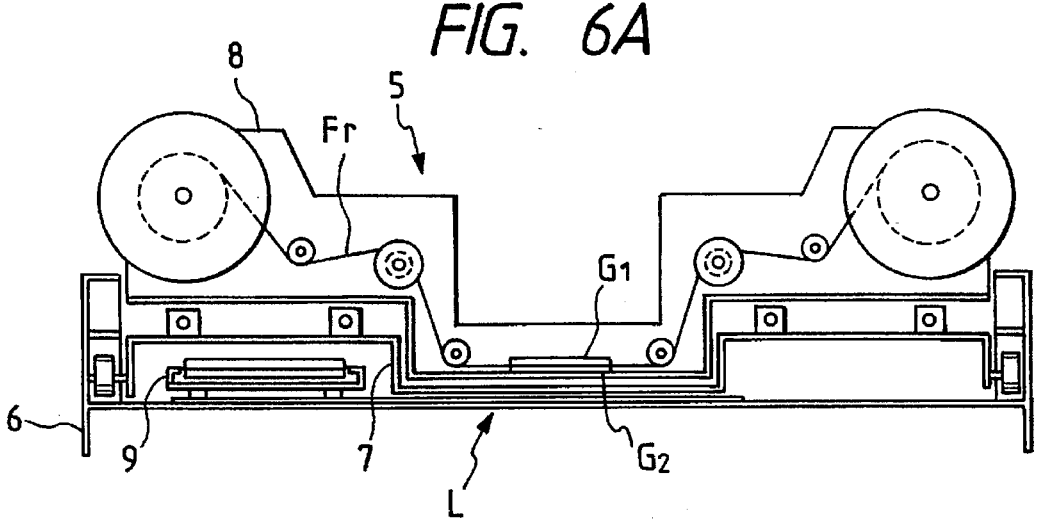
Figure 6B:
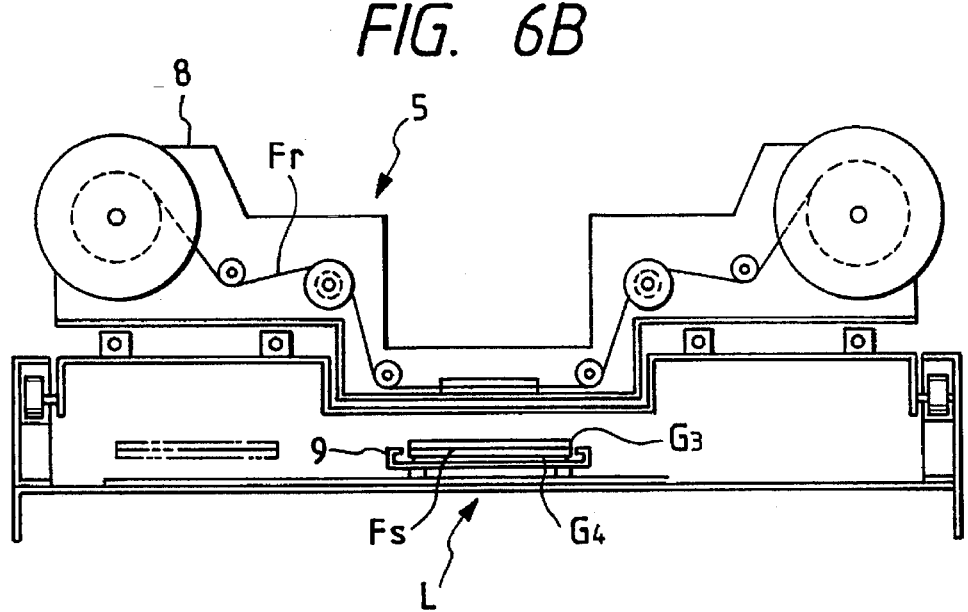

FIGS. 6A and 6B are front views of the film carrier 5, wherein FIG. 6A is a drawing to show a state in which the roll film Fr in the roll carrier 8 is located on the projection optical path L and FIG. 6B is a drawing to show a state in which the sheet film Fs in the sheet carrier 9 is located on the projection optical path L.

In FIG. 6A, the roll carrier 8 is drawn to this side, where the roll film Fr is located on the projection optical path L. On this occasion, the sheet carrier 9 is moved to the left edge of the base stage 6 and does not interfere with the roll carrier 8. Further, the sheet carrier 9 is located at the first retracting position lower than the second retracting position, and rightward movement of the sheet carrier 9 is impossible because the roll carrier base 7 stops the sheet carrier 9.

In FIG. 6B, the sheet carrier 9 is moved so as to locate the sheet film Fs mounted between the glasses $G_3$, $G_4$ on the projection optical path L, and the space for the movement is formed in such a manner that in moving the roll carrier 8 to the far side the rollers 10 move along the rails 11 to lift the roll carrier 8 up to the second retracting position. The sheet carrier 9 is arranged as movable back and forth and right and left in this space.

Figure 7A:
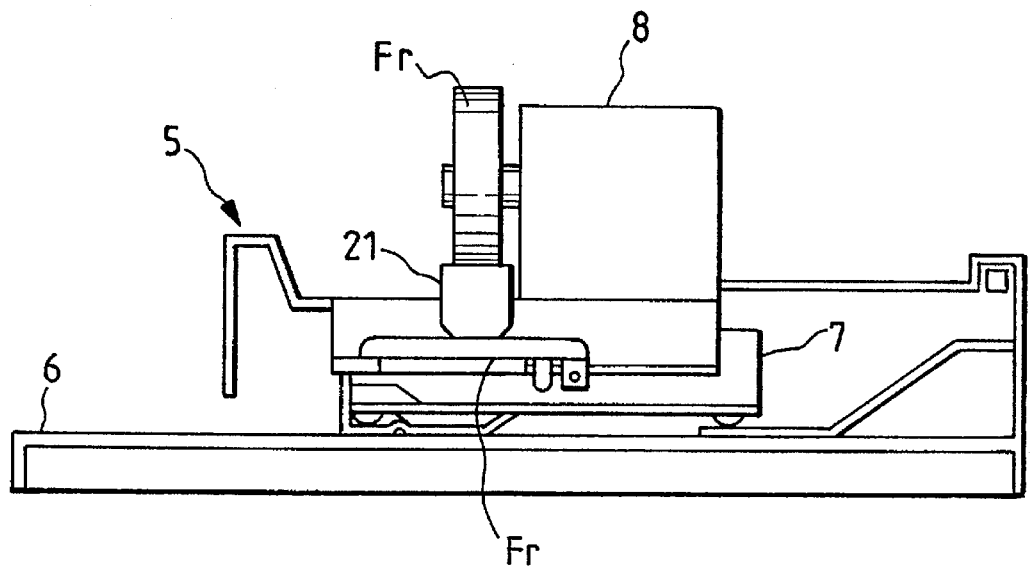
Figure 7B:
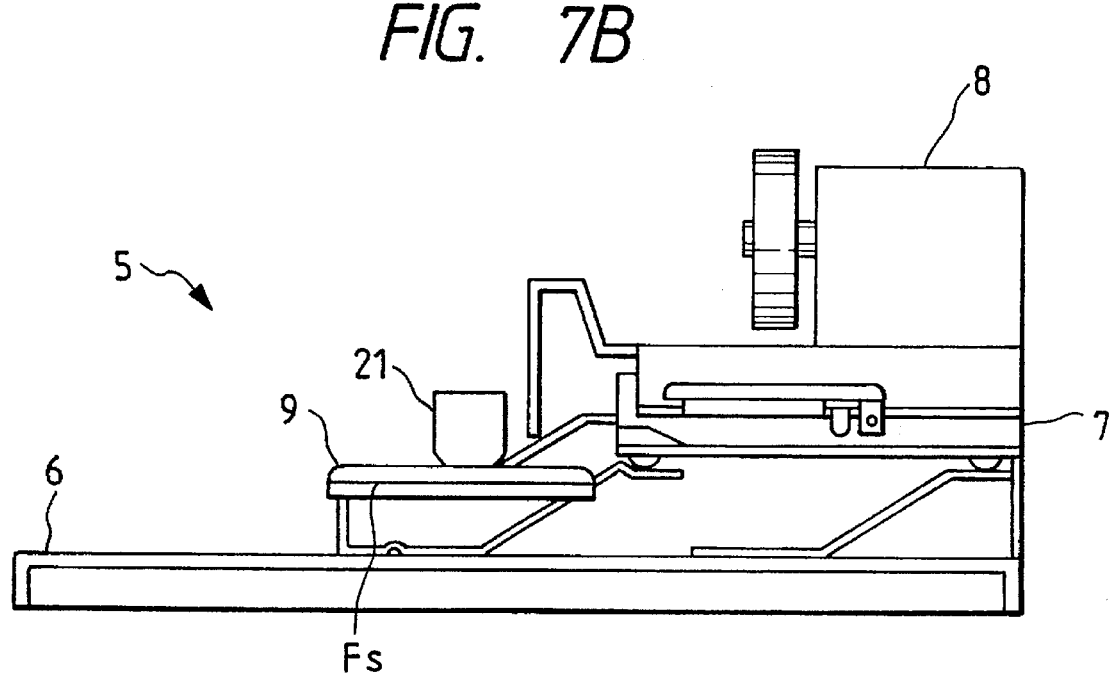

FIGS. 7A and 7B are schematic side views of the film carrier 5, wherein FIG. 7A is a drawing to show a state in which the roll carrier 8 is located at the use position where the roll film Fr is projected, and FIG. 7B is a drawing to show a state in which the sheet carrier 9 is located at the use position where the sheet film Fs is projected and the roll carrier 8 is lifted backward and upward to be located at the second retracting position.

The position of the roll film Fr in the height direction in projecting the roll film Fr in the roll carrier 8 is equal to the position of the sheet film Fs in the height direction in projecting the sheet film Fs in the sheet carrier 9, and the two films can be projected easily at a same magnification without a need to change positions of the projection lens 21 and condenser lens 3. If the positions of the two films are different from each other in the height direction, the difference can be dealt with by such an arrangement as to move the positions of the projection lens 21 and condenser lens 3, of course.

As so arranged, the roll film Fr can be moved to the second retracting position while being set in the roll carrier 8, and of course, the sheet film Fs can be moved to the first retracting position while being mounted on the sheet carrier 9. Thus, changeover between the roll film Fr and the sheet film Fs is easy, which can obviate the mounting or dismounting operation of roll film as required heretofore, thereby improving the operability and workability.

Figure 8:
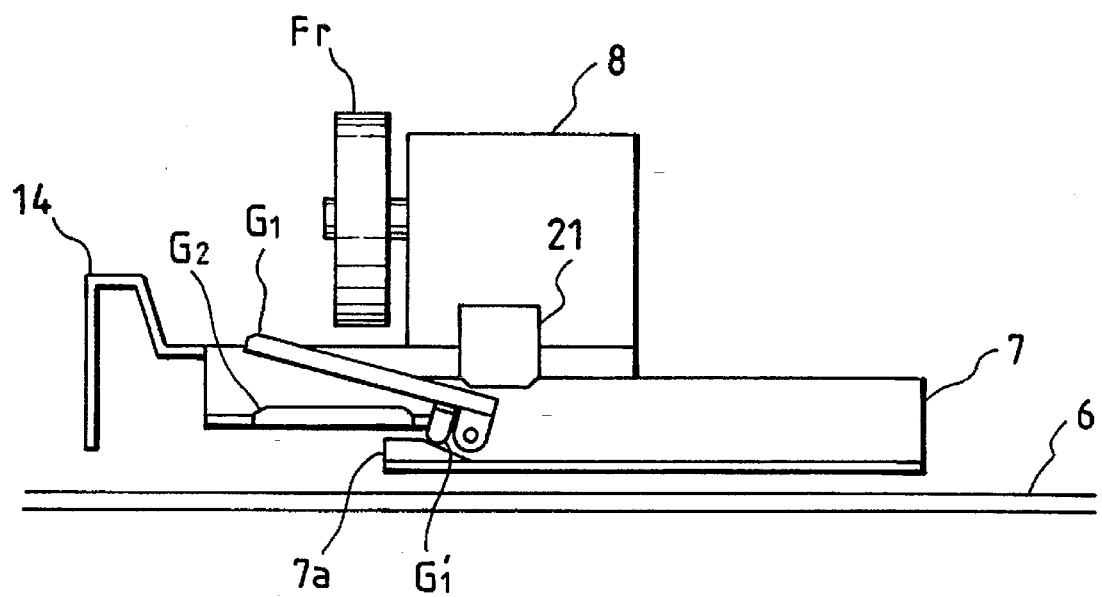
FIG. 8 is a schematic side view to show the opening and closing operation of glass of the roll carrier in the film carrier.

On the other hand, in the roll carrier 8 the roll film Fr is loaded as sandwiched between the glasses $G_1$, $G_2$ on the projection optical path L, and the upper glass $G_1$ is arranged to open in order to set the roll film Fr upon loading. Opening and closing of the upper glass $G_1$ is made by a cam 7a as an opening and closing member provided in the roll carrier base 7. This is shown in FIG. 8.

When the roll carrier 8 is pulled to this side to open the upper glass $G_1$, the roll carrier 8 moves together with the roll carrier base 7 on the base stage 6 to be fixed at the lock position of the roll carrier base 7 on this side, because a force for the roll carrier 8 to move relative to the roll carrier base 7 is set greater than a force for the roll carrier base 7 to move relative to the base stage 6. When the roll carrier base 7 is locked, the roll carrier 8 moves to this side relative to the roll carrier base 7, and a drive-on member $G_1'$ provided in the upper glass $G_1$ comes to run on the cam 7a provided in the roll carrier base 7 so as to open the upper glass $G_1$.

In contrast, for closing, the roll carrier 8 moves to that side relative to the roll carrier base 7, and the drive-on member $G_1'$ leaves the cam 7a so as to close the upper glass $G_1$ by its own weight.

After the upper glass $G_1$ is closed and when the roll carrier 8 is further moved to that side, the lock of the roll carrier base 7 to the base stage 6 is released, whereby the roll carrier 8 and the roll carrier base 7 move together.

On this occasion, a force for locking the roll carrier base 7 must be stronger than a force of the roll carrier 8 moving relative to the roll carrier base 7, but a too strong locking force would result in requiring a strong force for unlocking, thereby degrading the operability. If a difference should be too small between the locking force and the force of the roll carrier 8 moving relative to the roll carrier base 7, the locking force could become weaker because of various causes such as deformation of constituent members or abrasion after long-term use. In such cases, the roll carrier 8 becomes unitary with the roll carrier base 7, and the roll carrier base 7 is unlocked with the upper glass $G_1$ being kept open (or with the drive-on member being kept on the cam 7a). Then they move to that side, and upper glass $G_1$ will be forced to close at the position of projection lens 21, possibly causing breakage etc.

Figure 9:
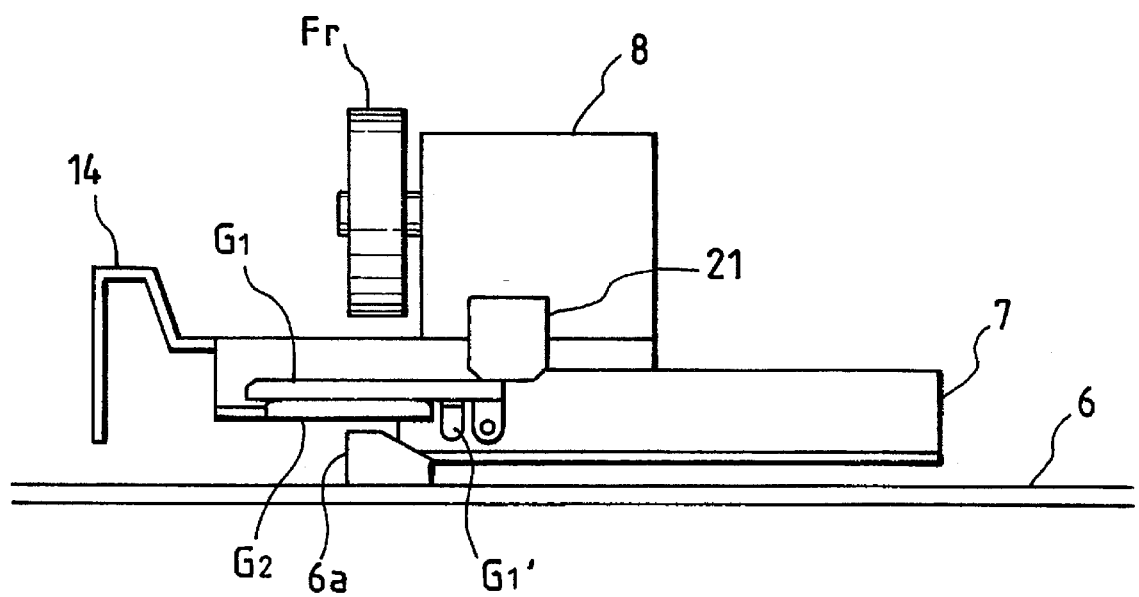
FIG. 9 is a schematic side view to show the opening and closing operation of glass of the roll carrier in the film carrier.

In order to avoid this possibility, a cam 6a is provided on the base stage 6, as shown in FIG. 9.

In FIG. 9, the base stage 6 is provided with the cam 6a as an opening and closing member on which the drive-on member $G_1'$ of the upper glass $G_1$ comes to run, and thus, different from the cam 7a provided in the roll carrier base 7 shown in FIG. 8, even if the difference is small between the locking force and the moving force of the roll carrier 8 relative to the roll carrier base 7 as described previously and the locking is first released to make the roll carrier 8 unitary with the roll carrier base 7, the upper glass $G_1$ is opened or closed depending upon the position of the roll carrier 8 relative to the base stage 6, that is, depending upon the positional relation between the drive-on member $G_1'$ on the upper glass $G_1$ in the roll carrier 8 and the cam 6a on the base stage 6, regardless of the position of the roll carrier 8 relative to the roll carrier base 7.

This arrangement can prevent the upper glass $G_1$ from being pressed by the projection lens 21, thus avoiding the possibility of breakage etc.

In this embodiment, an image can be displayed on a screen 40 from either one of the roll film Fr and the sheet film Fs, and the image can be transferred onto a sheet material or the like by image forming means (not shown). The apparatus can also be provided with image reading means making possible to store information as converted.

Although the film carrier 5 is arranged as detachably mounted on the reader-printer 1, the film carrier 5 may be built in the reader-printer 1, of course.

The present invention involves the above structure and operation, wherein the roll film carrier and sheet film carrier each can be retracted to their respective retracting positions outside the projection optical path, which permits the film projected to be changed to another without a need to perform a forced operation of mounting and dismounting the roll film and the sheet film, and wherein the carriers are set so as to overlap up and down (vertically), which can decrease the plane size of the film carrier body.

There are the base stage provided for movably supporting each of the roll film carrier and the sheet film carrier, and the base plate provided for making the roll film carrier movable and between the roll film carrier and the base stage, and the base plate is movable between the use position in using the roll film carrier and the second retracting position, whereby the base plate can move relative to the base stage and the roll film carrier can move relative to the base, thus improving the operability.

For setting the roll film carrier on the projection optical path, there is provided the fixing means for fixing the base plate relative to the base stage, so that the roll film in the roll film carrier is easy to move, thus improving the operability of the roll film carrier at the use position.

(Second Embodiment)

FIG. 10 to FIG. 15 show the second embodiment of the present invention.

Figure 10:
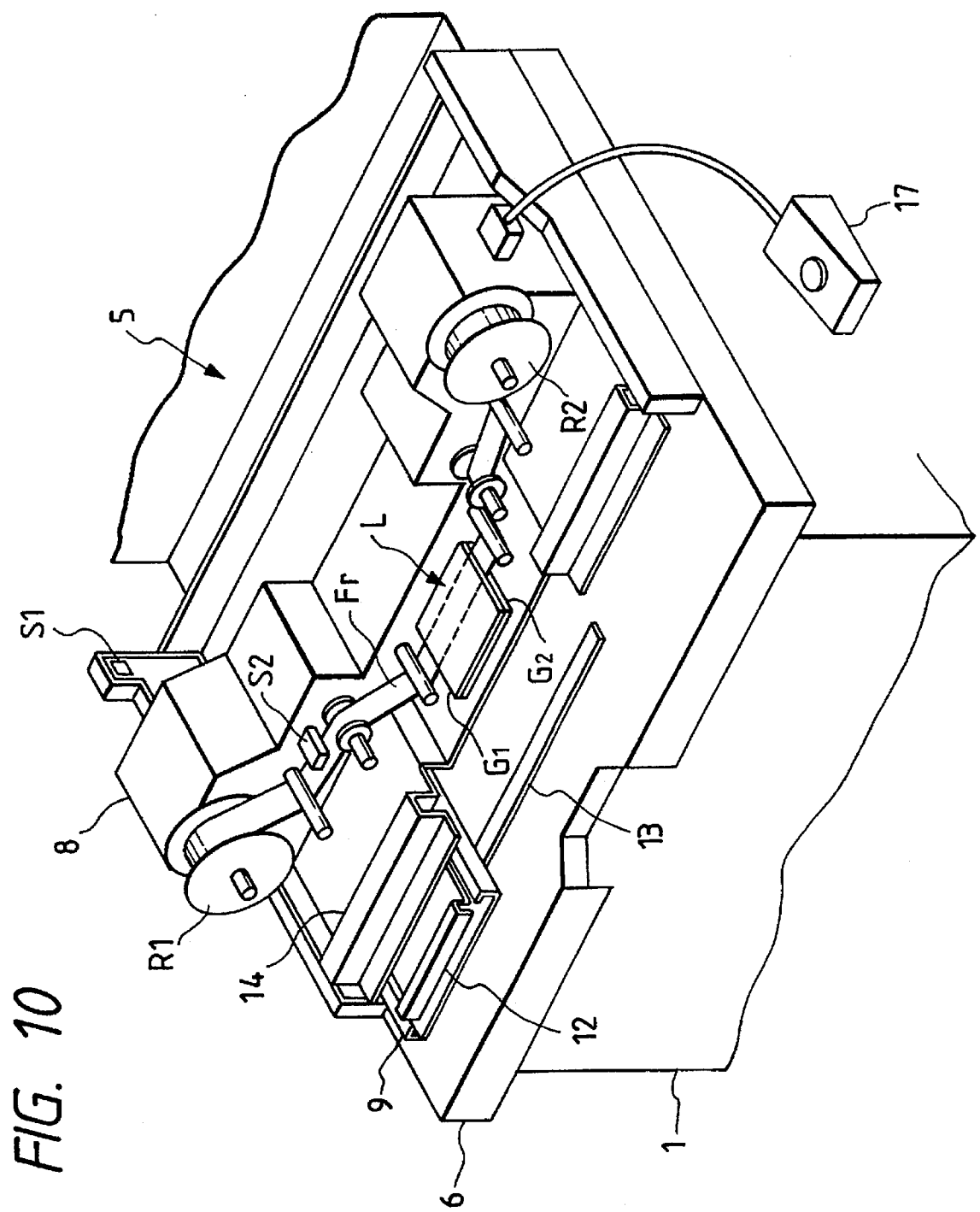
FIG. 10 is a perspective view of appearance to show a state in which the roll carrier in the film carrier of the second embodiment is used.

FIG. 10 is a drawing to show a state in which the roll carrier 8 is used, wherein in order to bring the roll film Fr onto the projection optical path L in the reader-printer 1, the sheet carrier 9 is moved to the left edge and the roll carrier 8 is pulled to this side to bring the roll carrier base 7 to the nearest position this side in synchronization therewith. In this state there is a space for retraction of the sheet carrier 9 between the roll carrier base 7 and the base stage 6. Here the roll carrier 8 is moved back and forth so as to adjust the position of the roll film Fr to set a frame desired to be projected in position. On this occasion, the glasses $G_1$, $G_2$ holding the roll film Fr between them are pressed by the projection lens 21. This assures stable transfer of the roll film Fr while preventing the roll film Fr from deviating from the transfer path.

After that, controlling a winding motor M2 (FIG. 11) for transfer of roll film provided in the roll carrier 8, based on a signal from the control unit 17 for transfer of roll film in the roll carrier 8, the roll film Fr is transferred right and left to locate a desired frame on the projection optical path L. This embodiment employs the winding motor M2 for transfer of roll film and a rewinding motor M1 as rewinding means for rewinding, but of course, the winding motor and rewinding motor can be constructed as a common motor.

Further, on the left rear side of the base stage 6 there is provided carrier detecting means S1 for detecting whether or not the roll carrier 8 is away from the projection optical path L and is retracted at the second retracting position, and there is also provided film detecting means S2 for detecting whether the roll film Fr is present or not on the roll film transfer path. The carrier detecting means S1 and film detecting means S2 do not always have to be located at the positions shown in FIG. 10, but may be located at any positions where they can perform satisfactory detection.

As the roll carrier 8 moves to that side, the roll carrier base 7 moves to that side in synchronization therewith and is lifted up. The lift-up of the roll carrier base 7 and roll carrier 8 forms a space between the roll carrier base 7 and the base stage 6, so that the sheet carrier 9 becomes movable right and left. Thus, the sheet carrier 9 is moved back and forth and right and left so as to bring the sheet film Fs sandwiched between the transparent glasses $G_3$, $G_4$ onto the projection optical path L.

In this manner the entire roll carrier 8 can be moved including the glasses $G_1$, $G_2$ supporting the roll film Fr and the sheet carrier 9 can also be moved in the same manner together with the glasses $G_3$, $G_4$ supporting the sheet film Fs, whereby the film projected can readily be changed without a need to perform a forced operation of mounting and dismounting the roll film Fr and sheet film Fs to be located on the projection optical path L, thus improving the operability.

If the carrier detecting means S1 and film detecting means S2 as described above detect that the roll carrier 8 is located at the second retracting position and that the roll film Fr is present on the roll film transfer path, the roll film Fr is automatically rewound by the rewinding motor M1.

The roll film Fr, however, does not have to be rewound, for example if the roll film Fr and sheet film Fs are projected as switching one to another, that is, even if the roll carrier 8 is retracted at the second retracting position but if it is soon brought back to the projection position to be used. There are, for example, the following methods (1) to (3) to determine whether the roll carrier 8 retracted at the retracting position is again used or not.

(1) To determine that the user does not use the roll carrier 8 again when the carrier detecting means S1 etc. continuously detects for a specified time the retracting state of the roll carrier 8 at the retracting position.

(2) To set two steps for the retracting position of the roll carrier 8 and to determine one as a position for again using the roll carrier (or as a position not to perform rewinding) and the other as a rewinding position.

(3) To determine that the roll carrier 8 is again used (or that rewinding is not to be performed) when the user preliminarily selects it upon retracting the roll carrier 8 to the retracting position.

In this manner determination can be made on whether the roll carrier 8 retracted at the retracting position is again used or not.

Figure 11:
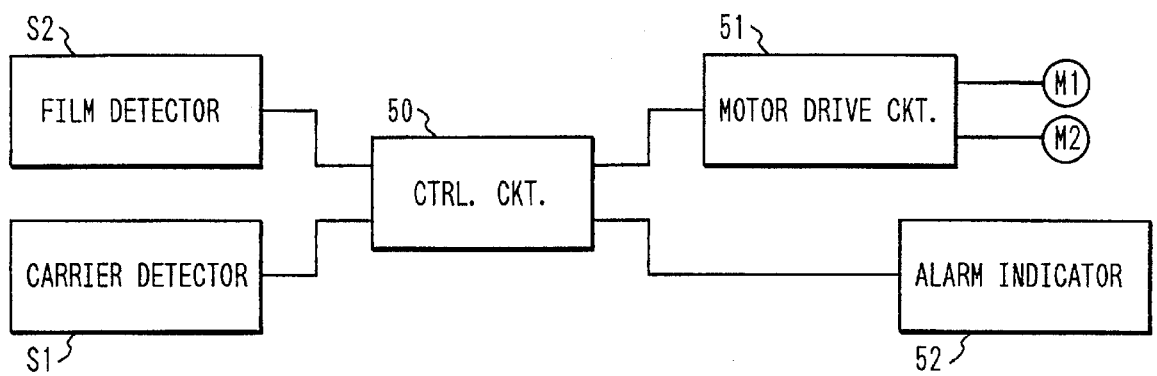
FIG. 11 is a block diagram of a control circuit for controlling rewinding of the roll film.

FIG. 11 is a block diagram of a control circuit for controlling rewinding of the roll film Fr.

In the drawing, first, when the carrier detecting means S1 detects that the roll carrier 8 is located at the second retracting position and sends a signal of the detection to a control circuit 50 and when the film detecting means S2 detects that the roll film Fr is present on the roll film transfer path of the roll carrier 8 and sends a signal of the detection to the control circuit 50, the control circuit 50 controls to actuate the rewinding motor M1 through a motor drive circuit 51 to rewind the roll film Fr onto the rewinding reel R1 before it becomes absent from the roll film transfer path. M2 designates a winding motor for rotating the winding reel R2 to wind up the roll film onto the winding reel R2.

If the power is interrupted though the roll film Fr is present on the roll film transfer path, an alarm indicator 52 operates to give an alarm to the user by alarm buzzer or alarm indication after a lapse of a predetermined time.

Of course, if the roll carrier 8 is set at the retracting position though the roll film Fr is present on the roll film transfer path of the roll carrier 8, the rewinding motor M1 operates to rewind the roll film Fr before it becomes absent on the roll film transfer path.

Figure 12:
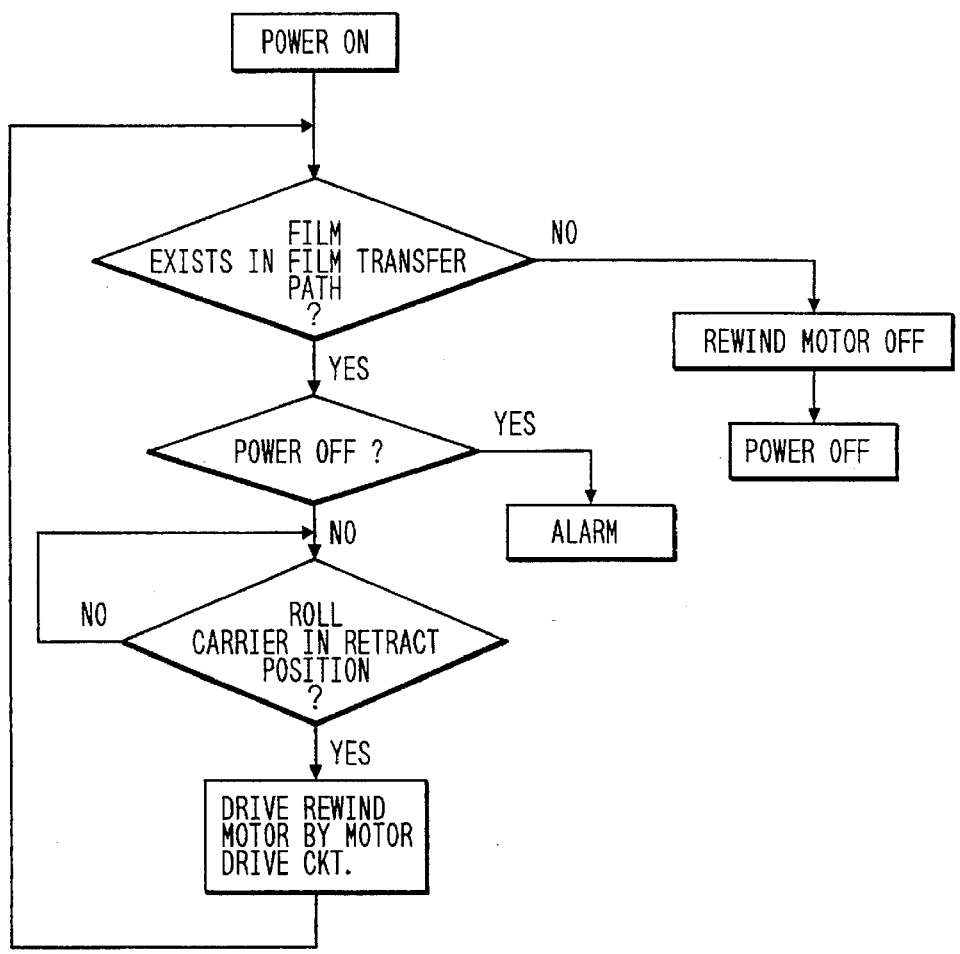
FIG. 12 is a flowchart to show rewinding of the roll film.

FIG. 12 is a flowchart to show the rewinding operation of the roll film.

Figure 13A:
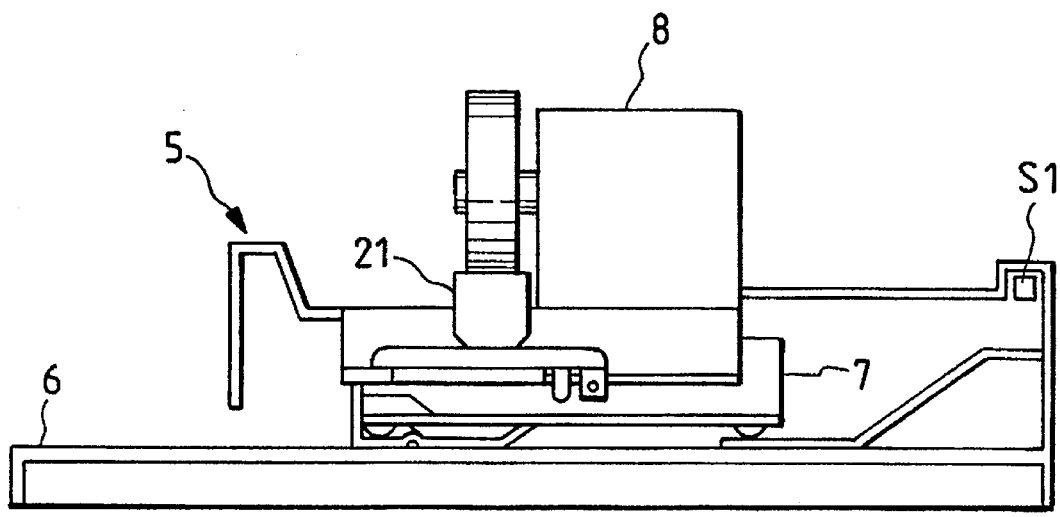
Figure 13B:
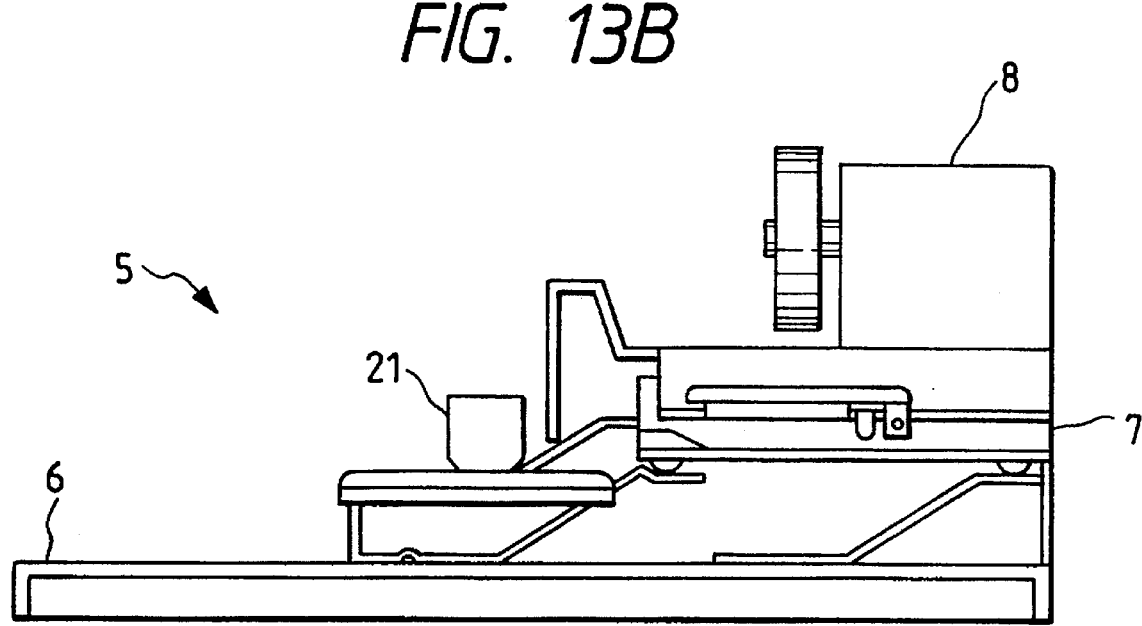

FIGS. 13A and 13B are schematic side views of the film carrier 5, wherein FIG. 13A is a drawing to show a state in which the roll film Fr in the roll carrier 8 is projected and FIG. 13B is a drawing to show a state in which the sheet film Fs in the sheet carrier 9 is projected and the roll carrier 8 is lifted backward and upward and then located at the second retracting position.

This arrangement can prevent the roll film Fr from being kept in the held state for a long time, thus preventing dust from attaching to the roll film Fr, preventing the roll film Fr from being damaged, or preventing components of the transfer path from being adversely affected or from being damaged. Further, the roll film Fr can be prevented from hardening to be shaped. Accordingly, superior transfer of roll film Fr can be performed.

(Third Embodiment)

Meanwhile, in the roll carrier 8 shown in FIG. 3, the roll film Fr is loaded as sandwiched between the glasses $G_1$, $G_2$ on the projection optical path L, but the glass $G_1$ presses the roll film Fr by its own weight. Thus, upon rewinding the roll film Fr, there is a possibility that the glass $G_1$ opens to make the roll film Fr deviate from the predetermined transfer position.

Figure 15:
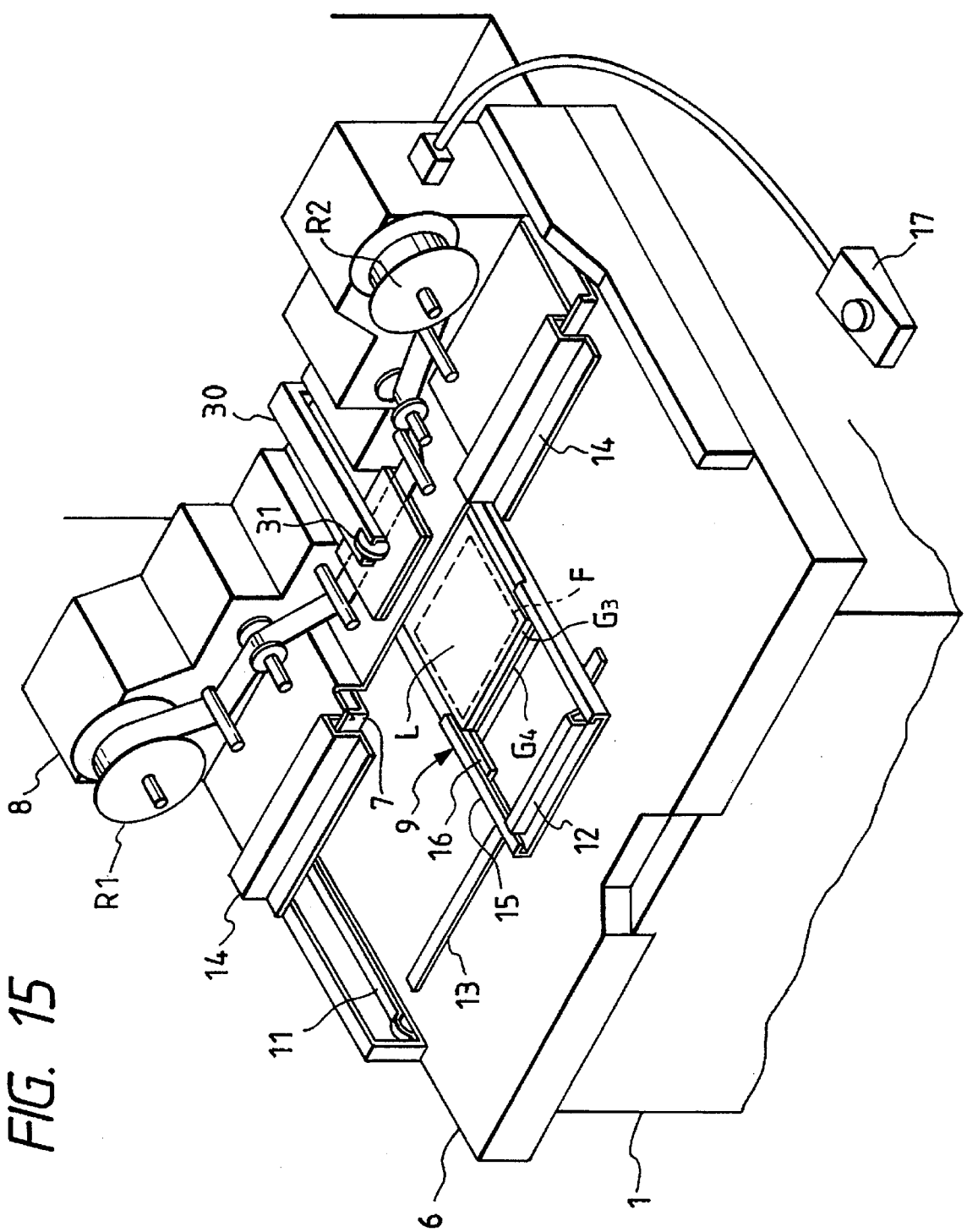
FIG. 15 is a perspective view of appearance to show a state in which the roll carrier in the film carrier of the third embodiment is retracted.

To solve this problem, FIG. 14 and FIG. 15 show the third embodiment provided with a pressing member 30 as holding means for pressing the glass $G_1$ in addition to the own weight when the roll carrier 8 is located at the retracting position.

In FIG. 15, the pressing member 30 is arranged to press the glasses $G_1$, $G_2$ holding the roll film Fr between them from the top when the roll carrier 8 is moved to the retracting position.

The pressing member 30 is provided with a roll 31 at the distal end thereof so as to reduce friction against the glass $G_1$ when the roll carrier 8 is moved to the retracting position or to the use position.

This pressing member 30 can prevent the roll film Fr from deviating from the predetermined transfer path upon rewinding, thus assuring superior rewinding of roll film Fr.

It is noted that this pressing member 30 is just an example but any means that can press the glass $G_1$ can be employed herein.

According to the above embodiment, if the roll film carrier is retracted at the retracting position and the detector detects presence of the roll film on the roll film transfer path, the roll film is rewound by the rewinding means before the roll film is removed from the roll film transfer path, thus becoming free of the conventional problems of attachment of dust to the roll film, damage of the roll film, and adversely affecting the components of the transfer path as damaging them.

Since the present embodiment has the holding means for holding the roll film sandwiched between the transparent plates upon retracting the roll film carrier, the roll film will not deviate from the transparent plates upon rewinding the roll film, thus assuring superior transfer without damage on the roll film.

(Fourth Embodiment)

Figure 16:
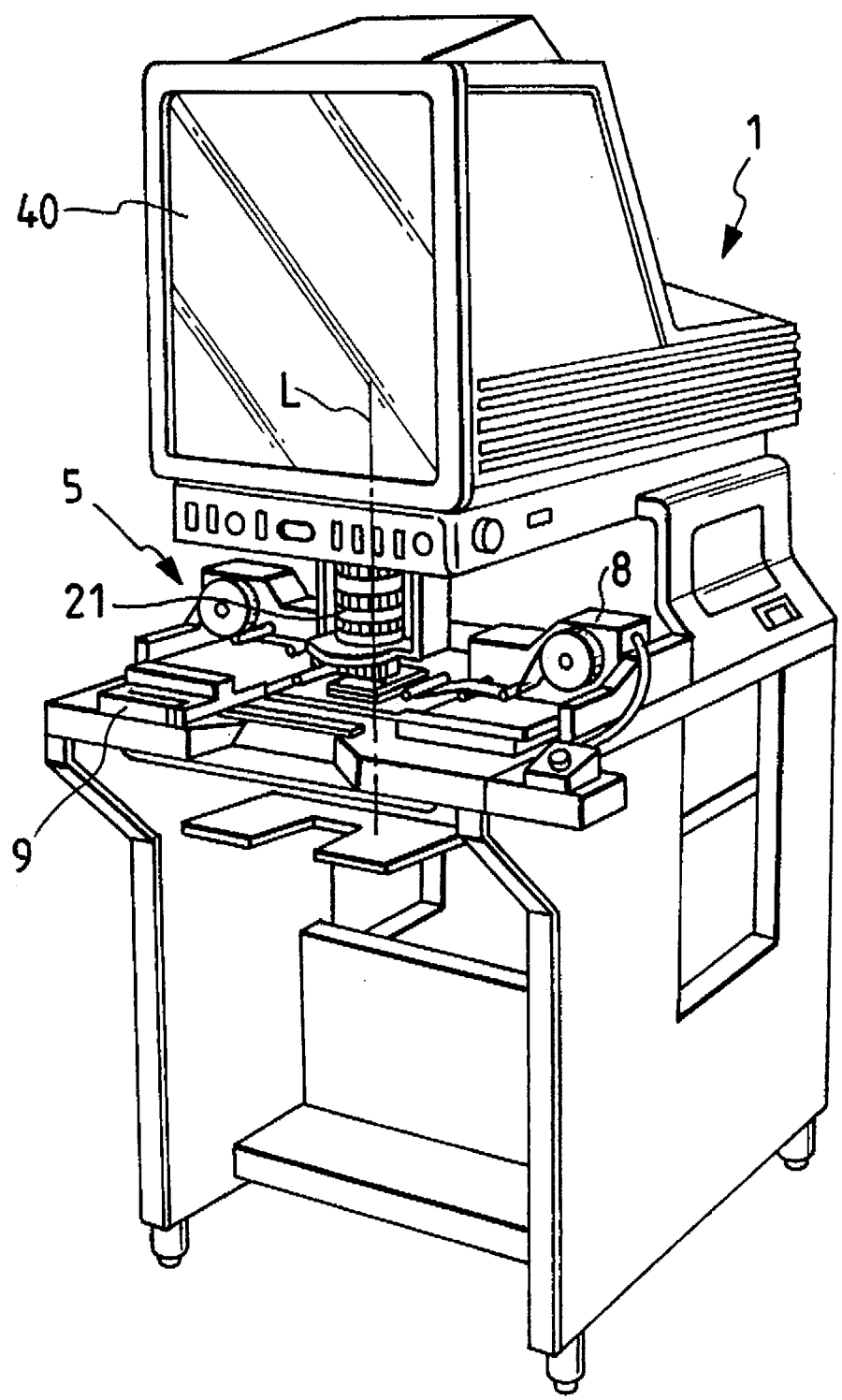
FIG. 16 is a perspective view of appearance to show a state in which the film carrier is mounted in the reader-printer as a projection apparatus of the fourth embodiment.

FIG. 16 is a perspective view of appearance to show the reader-printer 1 of the fourth embodiment as a projection apparatus in which the film carrier 5 is detachably mounted, or as an image forming apparatus.

In FIG. 16, the projection lens 21 is located above the projection position of the film carrier 5, and a projection image is projected as an enlarged image to the screen 40.

The film carrier 5 is provided with two carriers, the roll carrier (roll film carrier) 8 and the sheet carrier (sheet film carrier) 9, and either one of the carriers is selectively located in the projection optical path L to be used there.

Figure 17:
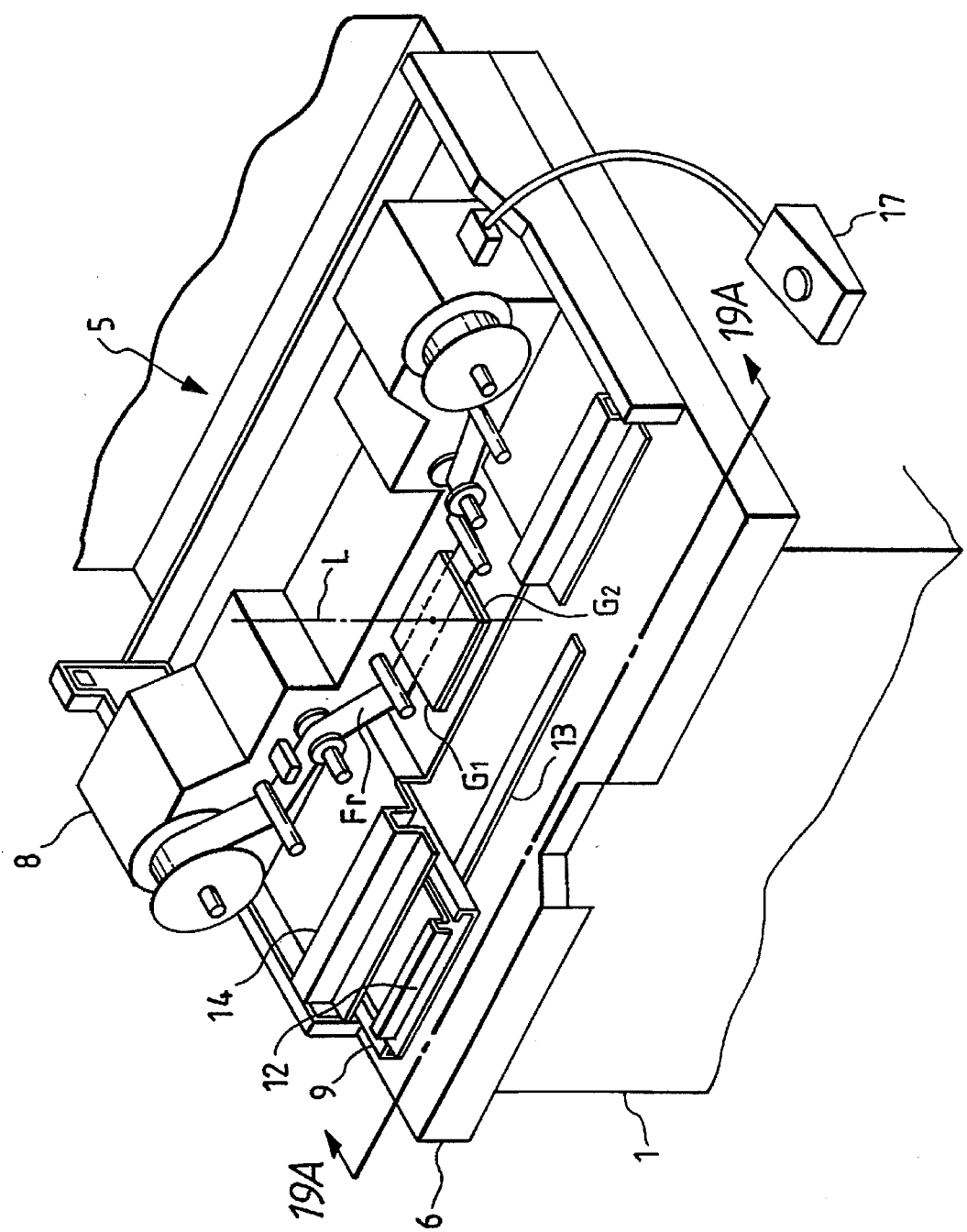
FIG. 17 is a perspective view of appearance to show a state in which the roll carrier in the film carrier is used.
Figure 18:
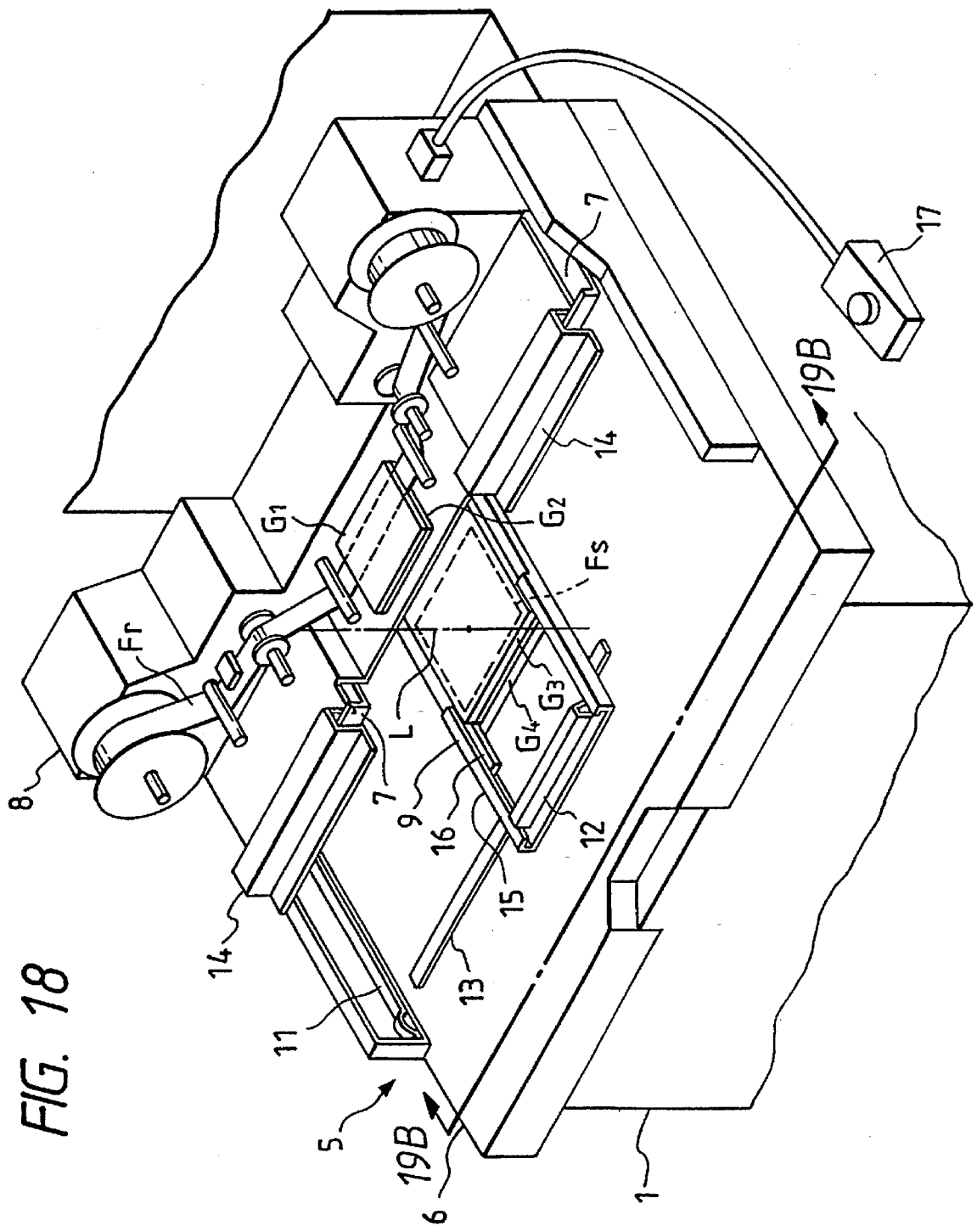
FIG. 18 is a perspective view of appearance to show a state in which the sheet carrier in the film carrier is used.

FIG. 17 and FIG. 18 are explanatory drawings of major part to show a state in which the film carrier 5 is mounted on the reader-printer 1, wherein the film carrier 5 is comprised of the base stage 6, the roll carrier base (base plate) 7, the roll carrier (roll film carrier) 8, and the sheet carrier (sheet film carrier) 9 and wherein the base stage 6 is fixed at a predetermined position in the reader-printer 1. The roll carrier 8 is provided with a transfer path for transferring the roll film Fr and glasses $G_1$, $G_2$ of transparent plates for holding the roll film Fr between them, and thus enables automatic transfer. Grasping the grip 14, the operator manipulates it to move the roll carrier back and forth relative to the roll carrier base 7. The roll carrier base 7 is so arranged that when the roll carrier 8 is pushed over the moving range to the roll carrier base 7, unrepresented rollers provided on the side faces of the base move along the rails 11 provided on the base stage 6 to move the roll carrier base 7 together with the roll carrier 8 back and forth and that in case of the roll carrier base 7 moving backward, the roll carrier base 7 is lifted up along the rails 11.

The sheet carrier 9 is comprised of the right-and-left moving frame 15 moving right and left along the rails 13 with manipulation of the grip 12, and the front-and-back moving frame 16 moving back and forth relative to the right-and-left moving frame 15, and the front-and-back moving frame 16 is provided with the glasses $G_3$, $G_4$ for holding the sheet frame Fs between them.

Figure 19A:
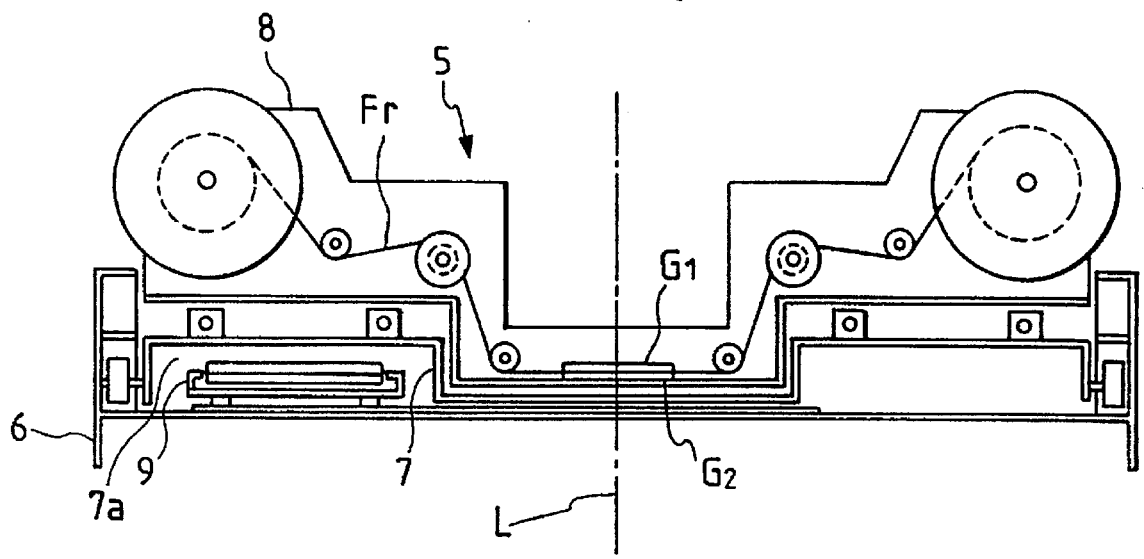
FIGS. 19A and 19B are schematic front views of the film carrier.

FIG. 17 is a drawing to show a state in which the roll carrier 8 is used, wherein in order to locate the roll film Fr on the projection optical path L of the reader-printer 1, the sheet carrier 9 is set at the predetermined retracting position at the left edge and the roll carrier 8 is pulled to this side whereby the roll carrier base 7 comes to the nearest position in synchronization therewith. In this state a space for retraction of the sheet carrier 9 is provided between the roll carrier base 7 and the base stage 6. Here the position of the roll film Fr is adjusted to locate a frame desired to project in position by moving the roll carrier 8 back and forth. The roll film transferring motor as transferring means provided in the roll carrier 8 is controlled based on a signal from the control unit 17 for transfer of roll film in the roll carrier 8 so as to transfer the roll film Fr right and left to locate a desired frame on the projection optical path L. FIG. 19A is a cross section along 19A—19A of FIG. 17, wherein the roll film Fr is located on the projection optical path L.

Figure 19B:
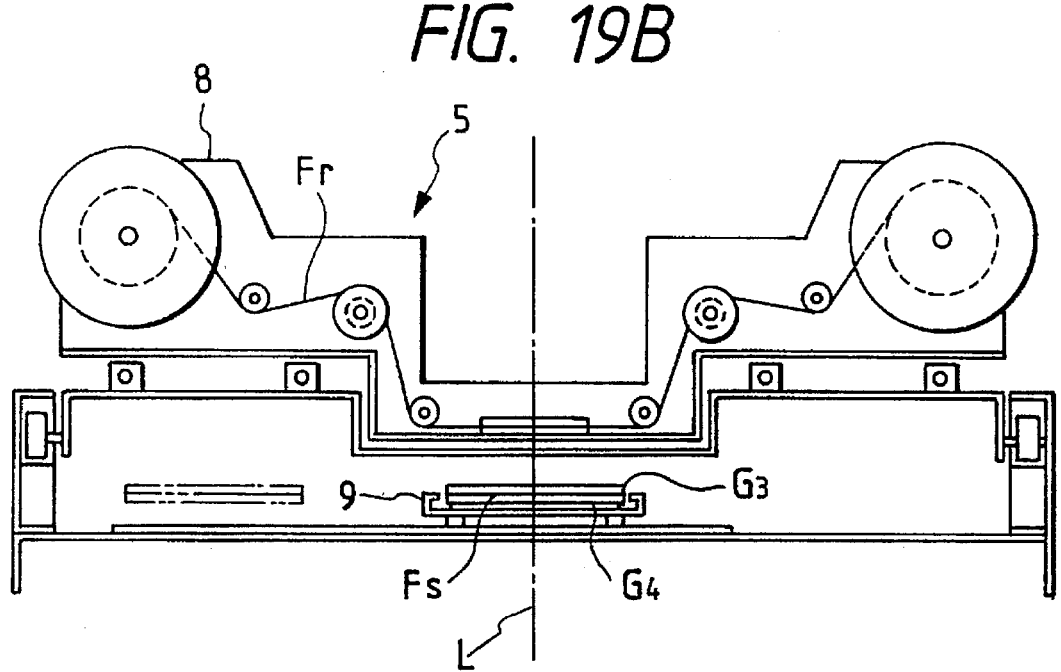

FIG. 18 is a drawing to show a state in which the sheet carrier 9 is used, wherein the roll carrier 8 is moved to that side and in synchronization therewith the roll carrier base 7 moves to that side to be lifted backward and upward so as to be located at the predetermined retracting position. The lift-up of the roll carrier base 7 and roll carrier 8 makes a space between the roll carrier base 7 and the base stage 6, so that the sheet carrier 9 becomes movable right and left. Thus, the sheet carrier 9 becomes movable back and forth and right and left so as to locate the sheet film Fs sandwiched between the transparent glasses $G_3$, $G_4$ on the projection optical path L. FIG. 19B is a cross section along 19B—19B of FIG. 18, wherein the sheet film Fs is located on the projection optical path L.

Since in this manner the roll carrier 8 can be moved including the glasses $G_1$, $G_2$ supporting the roll film Fr as a whole and the sheet carrier 9 can also be moved in the same manner together with the glasses $G_3$, $G_4$ supporting the sheet film Fs, the film projected can be readily changed to another without a need to perform a forced operation of mounting and dismounting the roll film Fr and the sheet film Fs to be located on the projection optical path L.

Particularly, the film carrier 5 in the above arrangement needs to be arranged to project image information of film as either the roll carrier 8 or the sheet carrier 9 is selectively located on the projection optical path L. Therefore, in the present invention there is provided lock means for permitting one carrier to become free to move only if the other carrier is retracted at the predetermined retracting position, in order to avoid interference between the carriers.

Figure 20A:
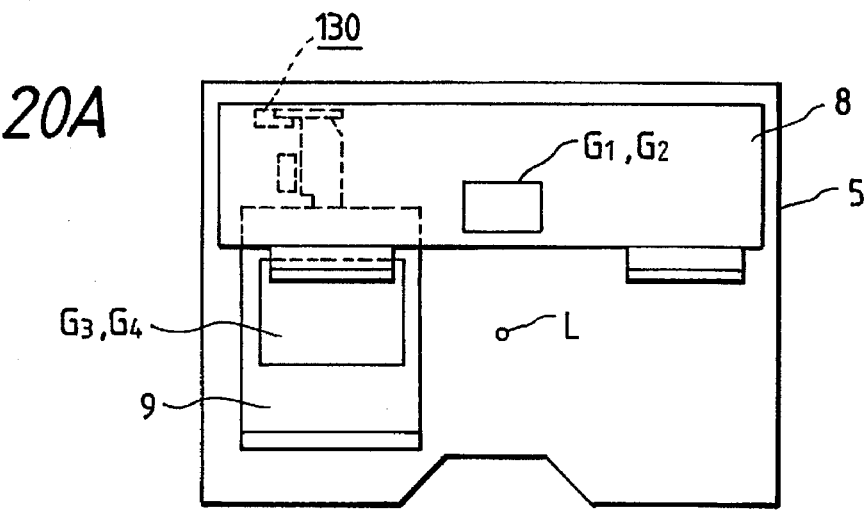
FIGS. 20A to 20C are conceptual drawings of operation of lock means 30.
Figure 20B:
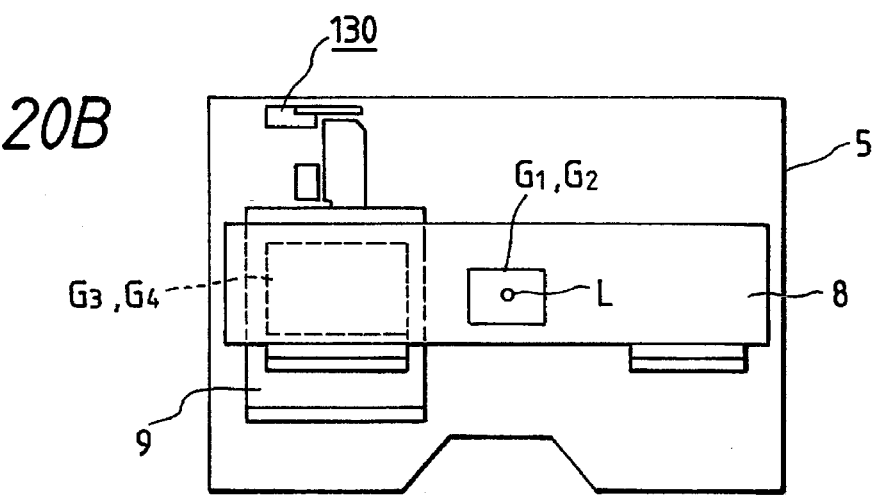
Figure 20C:
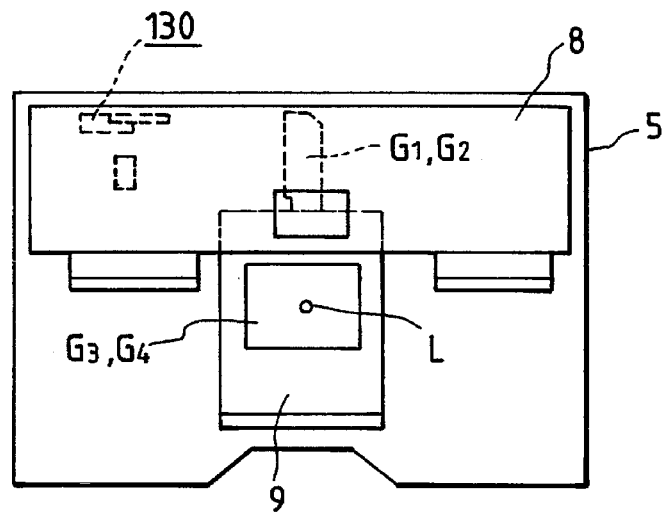

FIGS. 20A to 20C are conceptual drawings of operation of the lock means 130, and FIG. 20A is a top plan view to show a state in which the roll carrier 8 and the sheet carrier 9 are located at the respective predetermined retracting positions on the film carrier 5, wherein neither of the carriers is located on the projection optical path L.

In the present embodiment, as will be described in more detail, the lock means 130 keeps the roll carrier 8, as either one of the carriers, unmovable from the predetermined retracting position, and lock of the roll carrier 8 is released only when the sheet carrier 9 is retracted at the predetermined retracting position in the state of FIG. 20A. Accordingly, only from the state of FIG. 20A where the lock means 130 is released, the roll carrier 8 can be moved onto the projection optical path L as shown in FIG. 20B, or similarly, only from the state of FIG. 20A, the sheet carrier 9 can be moved onto the projection optical path L as shown in FIG. 20C.

FIG. 20C is a drawing to show a state in which the sheet carrier 9 is located on the projection optical path L after moved from the predetermined retracting position, wherein the lock means 130 locks the roll carrier 8 to keep it stationary because the sheet carrier 9 is not located at the predetermined retracting position.

Figure 21:
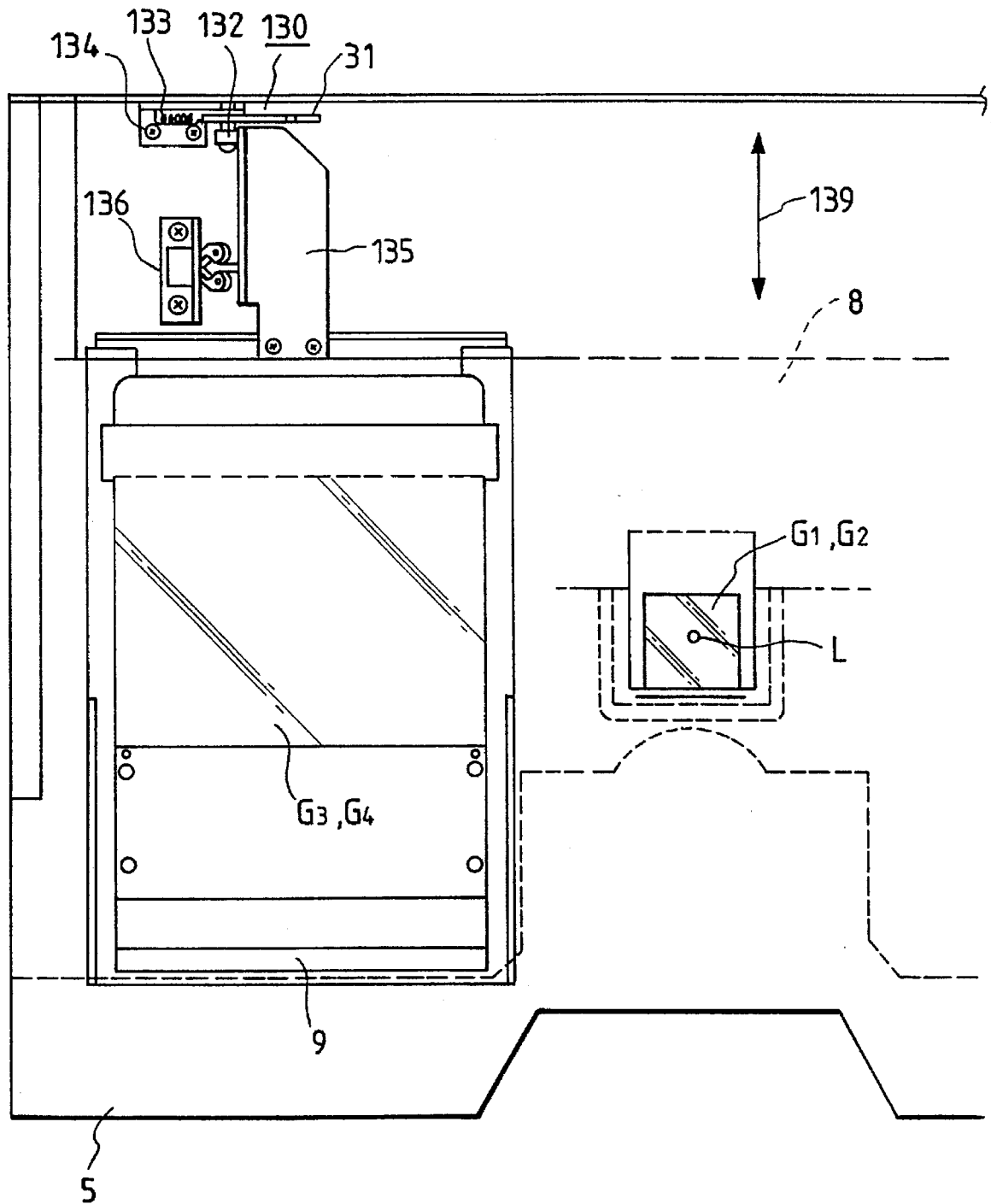
FIG. 21 is an explanatory drawing of the lock means.
Figure 22A:
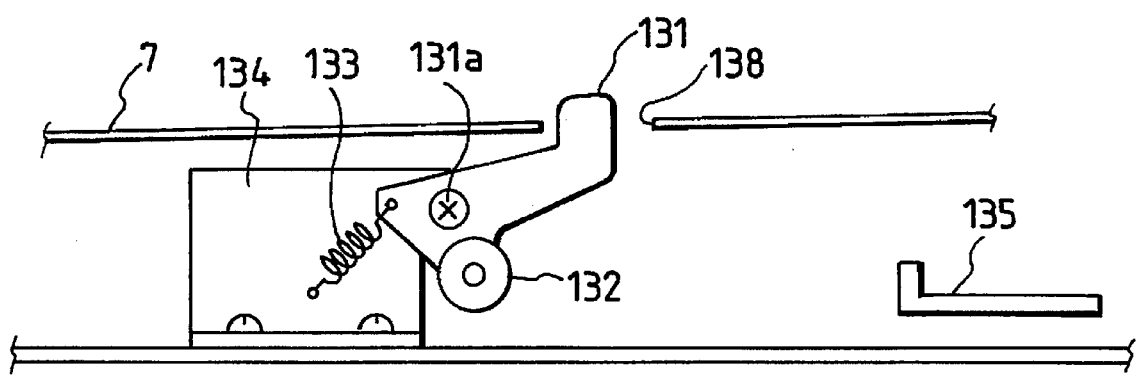
FIGS. 22A and 22B are conceptual drawings of operation of the lock means.
Figure 22B:
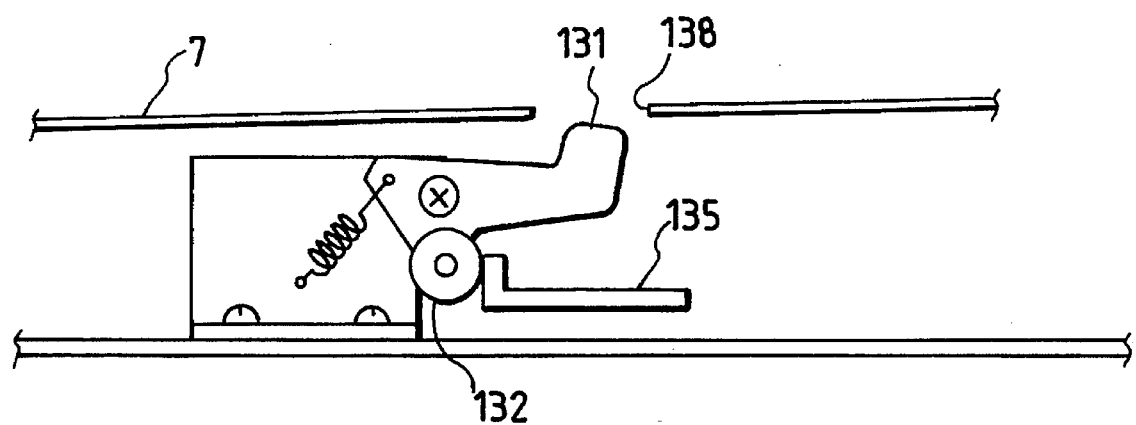

FIGS. 21 and 22A, 22B are explanatory drawings of operation of the lock means 130. Numeral 131 designates a lock pawl for fixing the roll carrier base 7 at the predetermined retracting position, which is engaged with a lock slot 138 provided in the roll carrier base 7 to fix the roll carrier base 7. Numeral 132 is a roll for releasing lock, which is arranged in such a structure that when a positioning cam 135, provided in the sheet carrier 9, for determining the retracting position of the sheet carrier 9 itself comes into contact with the roll, the lock pawl 131 rotates about a rotation shaft 131a to release the engagement with the lock slot 138, whereby the roll carrier 8 becomes movable in the directions of arrow 139 to be located on the projection optical path L. Numeral 133 denotes urging means for urging the lock pawl 131 toward the lock slot 138. Numeral 134 is a mount plate of the lock pawl 131. Numeral 136 is a catch as retracting position fixing means for fixing the sheet carrier 9 as keeping the sheet carrier 9 at the predetermined retracting position, which secures the sheet carrier 9 with a predetermined retaining force overcoming the urging means 133. The catch 136 may be the one using a spring as shown, one for fixing the sheet carrier 9 using a magnet, or any other known clamping member.

The lock means 130 in the above arrangement operates as follows. In FIG. 22A, where the sheet carrier 9 is away from the predetermined retracting position, the cam 135 is apart from the roll 132, so that the lock pawl 131 is engaged with the lock slot 138 in the roll carrier base 7 to fix the roll carrier 8 at the predetermined retracting position.

FIG. 22B shows a state in which the sheet carrier 9 is located at the predetermined retracting position to be fixed there by the catch 136, wherein the cam 135 is in contact with the roll 132 and the lock pawl 131 is apart from the lock slot 138 in the roll carrier base 7, whereby the roll carrier 8 becomes movable away from the predetermined retracting position onto the projection optical path L. In this case, even if the roll carrier 8 and the sheet carrier 9 are tried to move simultaneously, the lock means 130 operates to fix the roll carrier 8 where the sheet carrier 9 is moved a little earlier; or where the roll carrier 8 is moved a little earlier, the sheet carrier 9 will be stored in a sheet carrier storage 7a in the carrier base 7 as shown in FIG. 19A to become incapable of moving therefrom.

The present embodiment is so arranged that unlocking of the lock means is achieved by mechanical contact with the cam 135 of the sheet carrier 9, but a modification may be such that a sensor is provided at a specified position as arranged to generate a release signal of the lock means when the sheet carrier 9 is located at the predetermined retracting position, thereby unlocking the lock means.

The lock means of the present invention may be provided without any problem even in the cases where the carriers each move back and forth so as not to overlap with each other in three dimensions.

Further, in order to present a caution on manipulation of each carrier for the operator, it is also effective for preventing erroneous manipulation to stick to the apparatus a warning label noting that after each carrier is located at the retracting position, the lock means is unlocked to make the other carrier movable.

(Fifth Embodiment)

Figure 23:
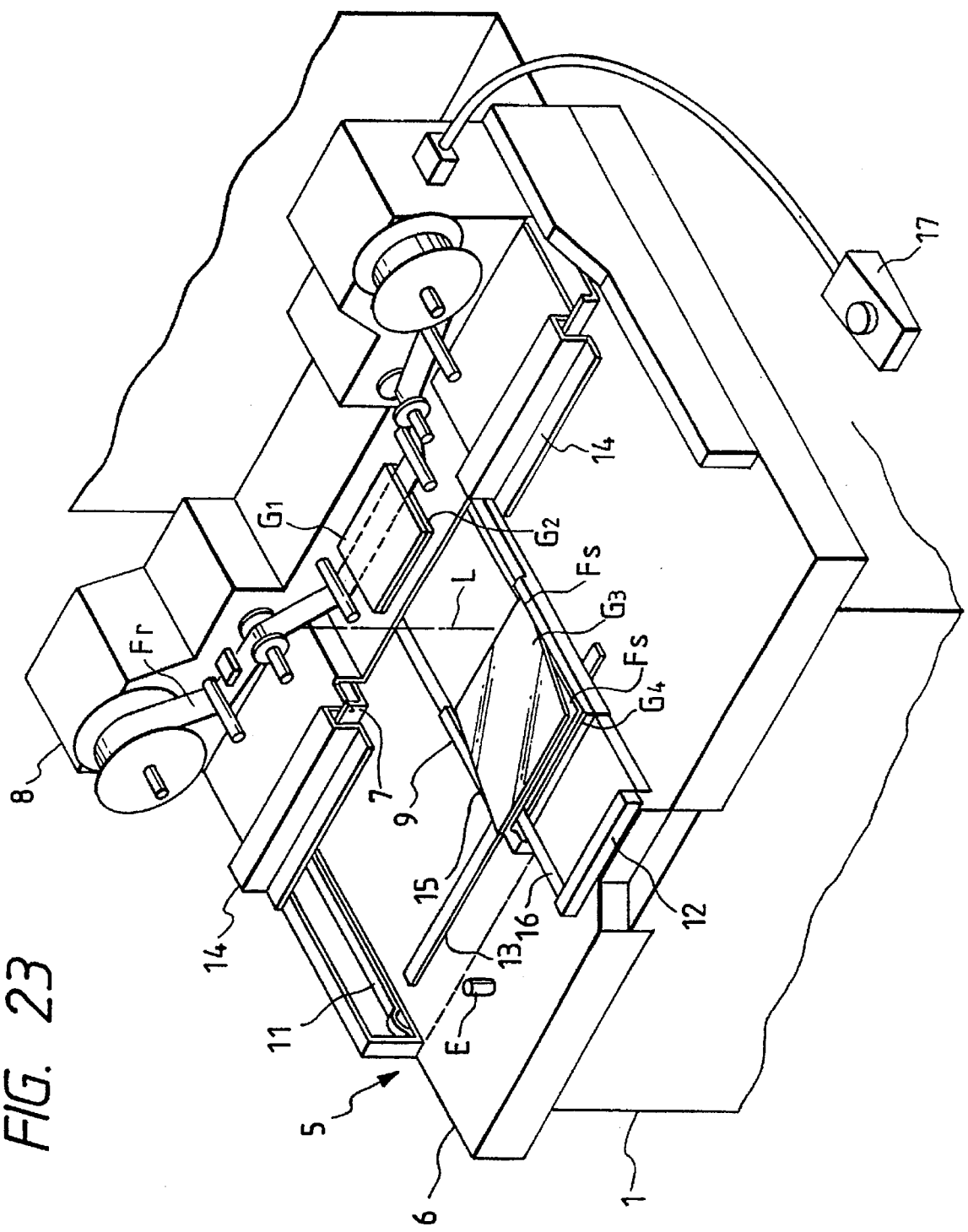
FIG. 23 is a schematic side view of the film carrier in the fifth embodiment of the present invention.

FIG. 23 is a drawing to show the film carrier of the fifth embodiment according to the present invention. FIG. 23 shows a state in which the roll carrier 8 is fixed at the predetermined retracting position and the sheet carrier 9 is located near the projection optical path L. In this case, the upper glass $G_3$ needs to open in order to set the sheet film Fs between the glasses $G_3$, $G_4$ for holding the sheet film Fs. The sheet carrier 9 in the present embodiment employs such a mechanism that when the grip 12 is pulled to this side, the front-and-back moving frame 16 moves to this side from the right-and-left moving frame 15 and in the state in which the grip 12 is pulled to the nearest position, the upper glass $G_3$ opens with movement of the front-and-back moving frame 16. (Since this mechanism is well known, the description thereof is omitted herein.)

In case of the above mechanism being employed, if upon retracting the sheet carrier 9 to the predetermined retracting position, the sheet carrier 9 should be able to be retracted in the state in which the front-and-back moving frame 16 of the sheet carrier 9 is moved to this side and that the upper glass $G_3$ for holding the sheet film Fs is open, the upper glass $G_3$ could be broken on the occasion when the roll carrier 8 next moves. Thus, a projection E is provided as a restricting member on a moving path of the front-and-back moving frame 16 on the base stage 6, so that the front-and-back moving frame 16 becomes movable to the retracting position only if the glass $G_3$ not projected to this side is not open. Therefore, this arrangement can avoid an accident that the roll carrier 8 moves though the upper glass $G_3$ is open, thus preventing the upper glass $G_3$ from being broken.

According to the above embodiment, there is provided the lock means for keeping one carrier free to move only if the other carrier is retracted at the predetermined retracting position, which can prevent collision between the carriers, breakage of the glass plate or other components, etc. and which can avoid careless manipulation of operator, thereby improving the operability.

Further, the lock means fixes the roll film carrier at the predetermined retracting position, and is unlocked when the sheet film carrier is retracted to the predetermined retracted position, whereby the roll film carrier becomes movable from the retracting position to the projection optical path.

The sheet film carrier is fixed by the retracting position fixing means for fixing the sheet film carrier at the position where the sheet film carrier is retracted at the predetermined retracting position.

The restricting member allows the sheet film carrier to be retracted to the retracting position in the state in which the transparent plate of the sheet film carrier is closed, thereby preventing breakage due to interference between the transparent plate and the roll film carrier.

(Sixth Embodiment)

Figure 24A:
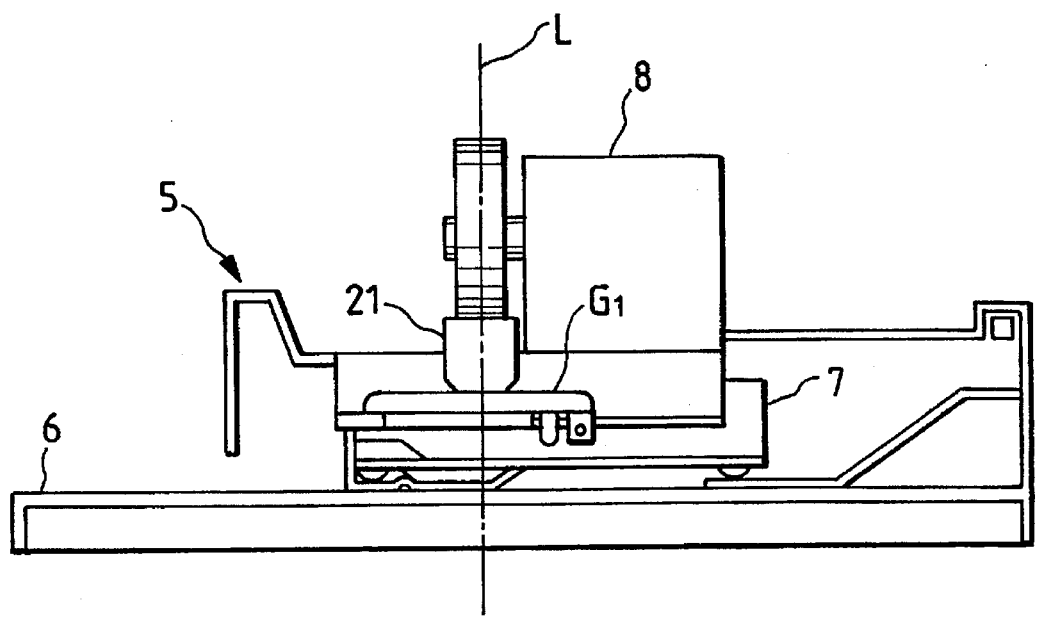
FIGS. 24A and 24B are schematic side views of the film carrier in the sixth embodiment.
Figure 24B:
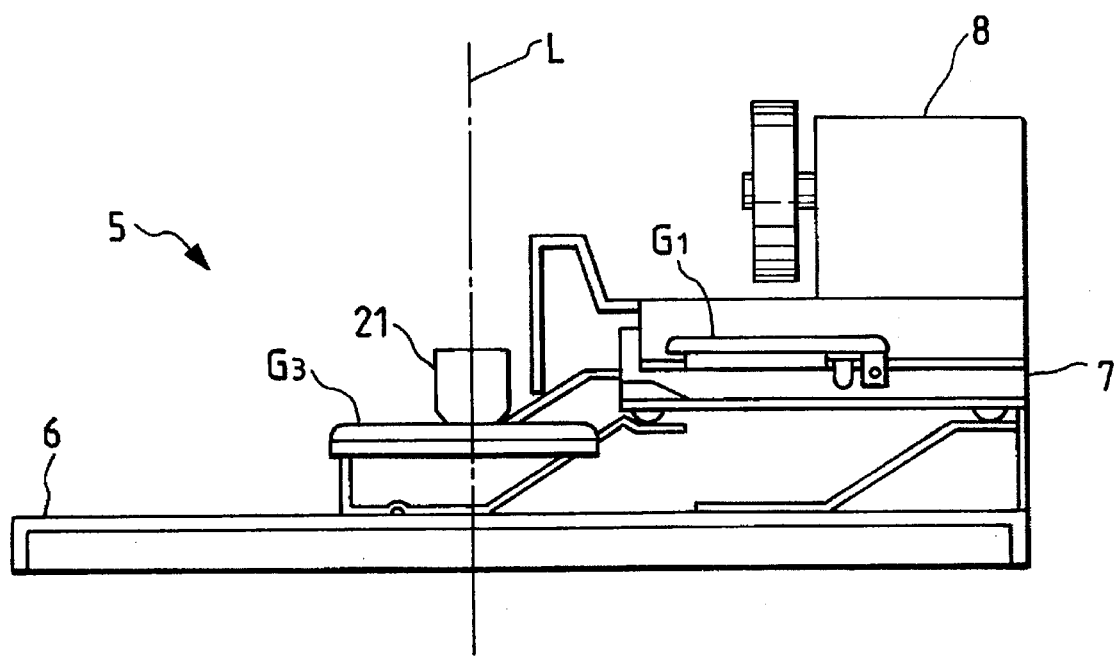

FIGS. 24A and 24B are schematic side views of the film carrier 5 of the sixth embodiment, wherein FIG. 24A is a drawing to show a state in which the roll carrier 8 is located at the projection position of the roll film Fr and FIG. 24B is a drawing to show a state in which the sheet film Fs in the sheet carrier 9 is located at the projection position.

Transfer of the roll film Fr needs to be performed in the state of FIG. 24A. In this state, the projection lens 21 presses the glass $G_1$, and thus, the roll film Fr can be smoothly transferred without being affected by fluttering etc. upon transfer. On this occasion, even if the roll carrier 8 moves a little to that side or to this side to cause the projection lens 21 to press the glass $G_1$ at the peripheral portion, the roll film Fr can be transferred without being affected by the flutter etc. upon transfer as long as the projection lens 21 holds the glass $G_1$; however, if the projection lens 21 is located off the region of glass $G_1$, the roll film Fr will be affected by the flutter etc. upon transfer.

Figure 25A:
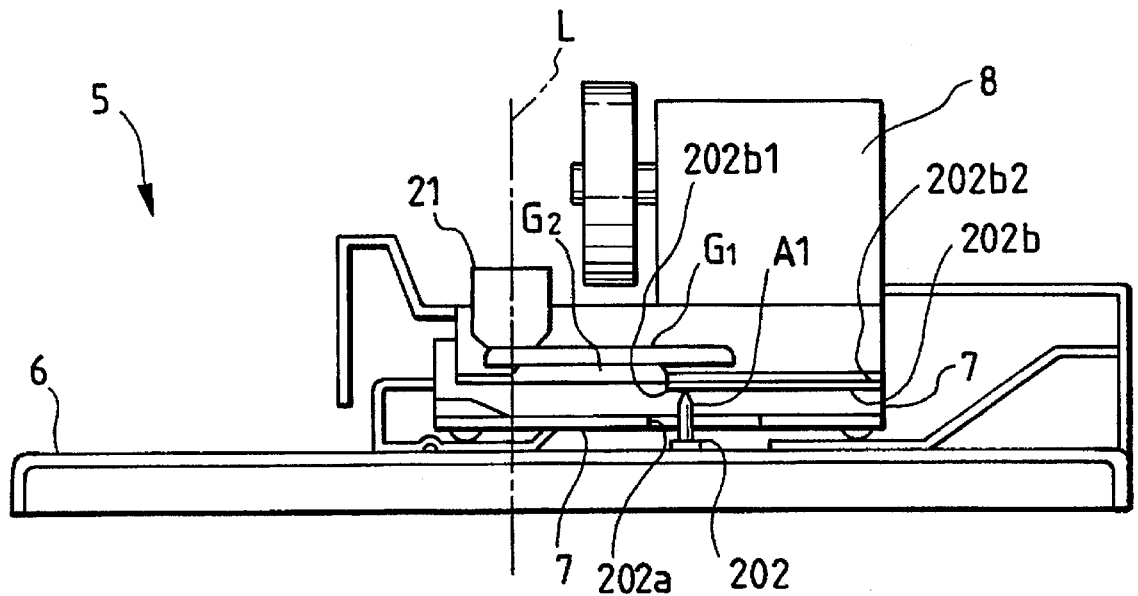
FIGS. 25A and 25B are explanatory drawings of structure of detecting means.
Figure 25B:
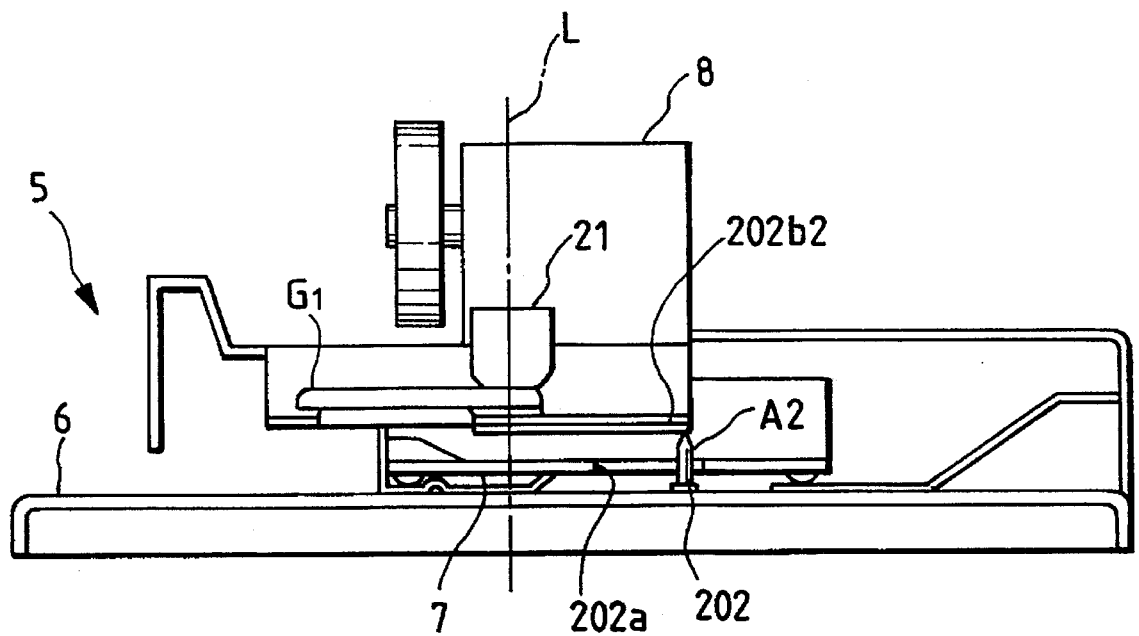

Described with FIGS. 25A and 25B is a reflection type sensor 202 as detecting means for detecting the position of roll carrier 8. The reflection type sensor 202 is provided at a predetermined position in the range where the roll carrier on the base stage 6 moves. Numeral 202a denotes a sensor hole formed through the roll carrier base 7, which lets a sensor beam from the reflection sensor 202 pass. A sensor reflection plate 202b provided on the bottom of the roll carrier 8 has a length corresponding to the limit range where the roll film Fr can be smoothly transferred without being affected by the flutter etc. upon transfer as the projection lens 21 holds the glass $G_1$ in case of the roll carrier 8 moving back and forth, and the reflection sensor 202 is located at the predetermined position as opposed to both edges 202b1, 202b2 of the sensor reflection plate 202b in the borders of the above limit range. A black coating may be given on portions opposed to the reflection sensor 202 and except for the sensor reflection plate 202b in order to avoid a malfunction of the reflection sensor 202.

FIG. 25A shows the front limit position of the limit range where the glass $G_1$ of the roll carrier 8 is held by the projection lens 21. If the roll carrier 8 further moves backward from the limit position, no holding force of the projection lens 21 is exerted on the glass $G_1$. If the roll film Fr is transferred in that state, the above problem will arise. At the limit position, the sensor beam A1 emitted from the reflection sensor 202 is reflected by the edge 202b1 of the sensor reflection plate 202b, and the sensor generates a signal indicating that the roll carrier 8 is located in the predetermined range where the roll film Fr can be transferred, thus not inhibiting the automatic transferring operation.

FIG. 25B shows the rear limit position of the limit range where the glass $G_1$ of the roll carrier 8 is held by the projection lens 21. If the roll carrier 8 advances from the limit position, no holding force of the projection lens 21 remains on the glass $G_1$. Thus, if the roll film Fr is transferred in that state, the above problem will arise. At this limit position, the sensor beam A1 emitted from the reflection sensor 202 is reflected by the edge 202b2 of the sensor reflection plate 202b, and the sensor generates the signal indicating that the roll carrier 8 is located in the predetermined range where the roll film Fr can be transferred, thus not inhibiting the automatic transferring operation.

Figure 26A:
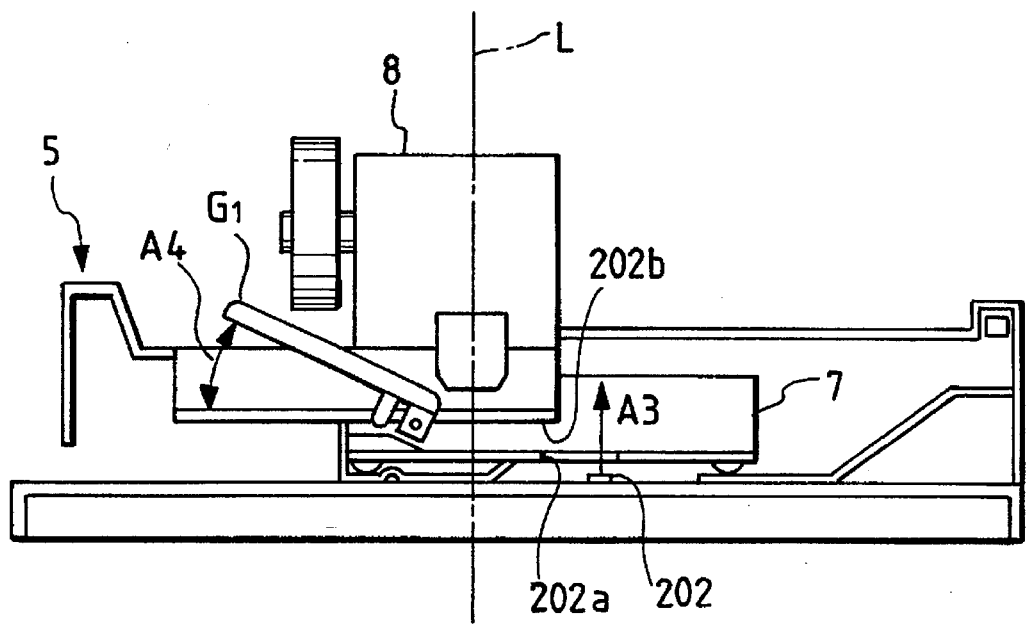
FIGS. 26A and 26B are drawings to show a state in which the roll carrier is in the range of transfer inhibition of the roll film.
Figure 26B:
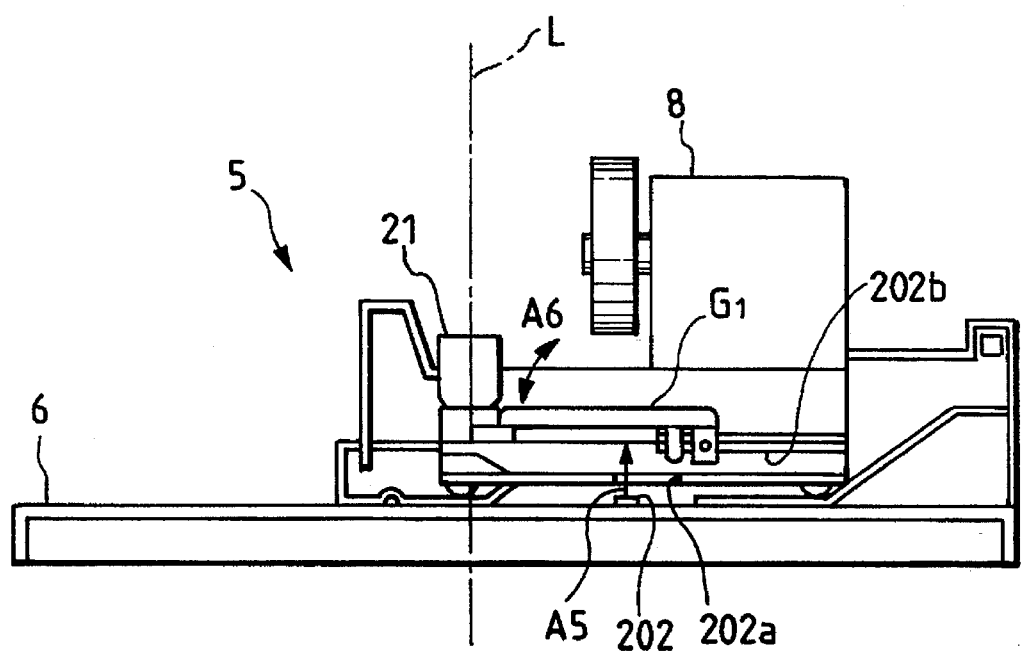

If the roll carrier 8 moves over either one of the above limit positions, the glass $G_1$ becomes not to be held by the projection lens 21, as shown in FIGS. 26A or 26B, so that it becomes free to open or close as shown by the arrow of A4 or A6. In this case, the sensor beam A3, A5 emitted from the reflection sensor 202 is not reflected by the sensor reflection plate 202b, and the sensor generates a signal indicating that the roll carrier 8 is off the predetermined range where the roll film Fr can be transferred, thus inhibiting the automatic transferring operation of the transferring means by the control circuit not shown.

The reflection sensor 202 herein is set on the top surface of the base stage 6, but, not limited to the top surface, it may be set on the side surface, or it may be set not on the base stage 6, but on the roll carrier 8. Further, the sensor may be one as constructed to send a signal that the roll carrier 8 is located at a predetermined position for holding the transparent plate in the closed state if the projection lens 21 is located on the glass $G_1$.

The reflection type sensor 202 as the detecting means may be any other known sensor, for example a proximity sensor, a limit switch, and so on.

Figure 27A:
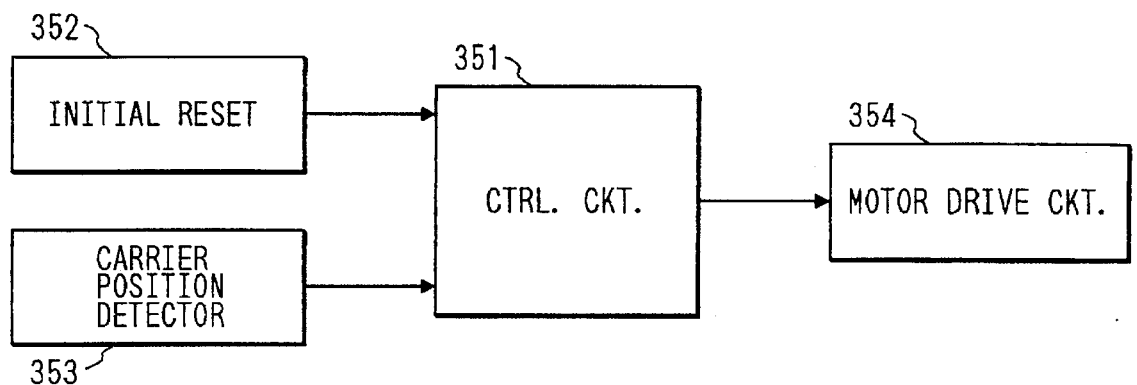
FIG. 27A is a block diagram of a control circuit.

FIG. 27A is a block diagram of the control circuit for inhibiting the automatic transferring operation, in which an initial reset signal 352 and a carrier position detection signal 353 are input into the control circuit 351 and the control circuit 351 controls a motor drive circuit 354, based on the signals.

Figure 27B:
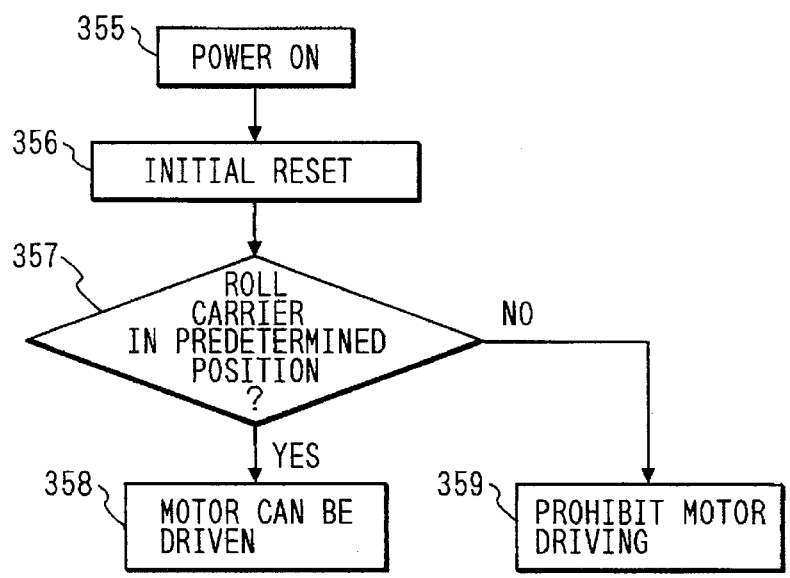
FIG. 27B is a control sequence diagram of the control circuit.

FIG. 27B is a control sequence diagram of the control circuit 351. When the power is on (355), initial reset is next requested, and the initial reset is performed automatically or manually by operator (356). It is then determined based on a signal from the sensor 202 whether the roll carrier 8 is located at the predetermined position where the glass $G_1$ (transparent plate) is held closed (357). If it is located at the predetermined position, drive of motor is allowed (358). If it is not at the predetermined position, drive of motor is inhibited, judging that the glass $G_1$ (transparent plate) is not closed (359).

According to the above embodiment, when the detecting means detects that the roll film carrier is off the predetermined position where the transparent plate is held closed, the automatic transferring operation of the transferring means is inhibited. Thus, if the transparent plate is not held in the closed state, the automatic transferring operation of the transferring means is inhibited, which can prevent the roll film from deviating from the transfer path because of the flutter upon transfer with opening of the transparent plate or which can prevent the roll film Fr from being damaged or folded when it is off the transfer path.

What is claimed is:

1. A film carrier, arranged to use either a roll film or a sheet film as selectively locating either one of the roll film and the sheet film in an optical path of a projection apparatus, comprising:

a base stage detachably mountable to the projection apparatus;

a sheet carrier for supporting a sheet film, said sheet carrier being disposed on said base stage so as to move between a use position and a first retracting position; and a roll carrier for supporting a roll film, said roll carrier disposed on said base stage so as to move between said use position and a second retracting position, said roll carrier being movable independently of said sheet carrier, wherein said second retracting position is set at a different height from said use position.

2. The film carrier according to claim 1, wherein said first retracting position and said second retracting position are set at different heights from each other and wherein at the respective retracting positions the two carriers are arranged in such a relation that at least parts thereof overlap vertically.

3. The film carrier according to claim 1, wherein said roll carrier is movable in a direction perpendicular to a transfer direction of the roll film and wherein said roll carrier is disposed at said use position or at said second retracting position as moved in said direction perpendicular to the transfer direction.

4. The film carrier according to claim 3, wherein said sheet carrier is movable in the transfer direction of the roll film and in the direction perpendicular to the transfer direction and wherein said sheet carrier is disposed at said use position or at said first retracting position as moved in said transfer direction.

5. The film carrier according to claim 1, wherein said roll carrier comprises supporting means for supporting first and second reels and transferring means for transferring a roll film wound around said first reel to said second reel.

6. The film carrier according to claim 5, further comprising carrier detecting means for detecting a position of said roll carrier, film detecting means for detecting whether the roll film is present in a transfer path of the roll film, and means for controlling said transferring means, based on output signals from said carrier detecting means and said film detecting means.

7. The film carrier according to claim 6, wherein said controlling means actuates said transferring means so as to rewind the roll film to said first reel when said roll carrier is located at said second retracting position and when the roll film is present in said transfer path.

8. The film carrier according to claim 1, further comprising means for preventing one carrier from moving from the retracting position when the other carrier is located at said use position.

9. The film carrier according to claim 1, comprising a base plate disposed on said base stage and arranged as movable between a first height position and a second height position, wherein said roll carrier is disposed as movable on said base plate, said roll carrier moves between said first height position and said second height position in synchronization with movement of said base plate, and said roll carrier is movable independently of said base plate when placed at said first height position.

10. The film carrier according to claim 9, wherein said roll carrier comprises supporting means for supporting first and second reels and transferring means for transferring the roll film wound around said first reel to said second reel.

11. The film carrier according to claim 9, wherein said use position is at said first height position and said second retracting position is at said second height position.

12. The film carrier according to claim 11, wherein said first retracting position of said sheet carrier is at said first height position.

13. A film carrier comprising:

a base stage having an aperture through which light for illuminating a film can pass;

a first moving member disposed on said base stage for positioning a portion to be illuminated in a roll film at a use position along said aperture, said first moving member comprising a transparent plate for holding the portion to be illuminated in the roll film in a flat state, said first moving member being movable between said use position and a retracting position back from said use position; and a second moving member disposed on said base stage, for positioning a portion to be illuminated in a sheet film, at said use position, said second moving member comprising a transparent plate for holding the sheet film in a flat state, said second moving member being movable between said use position and another retracting position different in height from said retracting position.

14. The film carrier according to claim 13, wherein at the respective retracting positions said moving members are disposed so that at least parts thereof overlap vertically.

15. The film carrier according to claim 13, wherein said first moving member moves in a direction perpendicular to a transfer direction of the roll film and wherein said second moving member moves in said transfer direction and in said direction perpendicular to said transfer direction independently of said first moving member.

16. The film carrier according to claim 13, wherein said first moving member comprises supporting means for supporting first and second reels, and transferring means for transferring a roll film wound around said first reel to said second reel.

17. The film carrier according to claim 16, further comprising position detecting means for detecting a position of said first moving member, film detecting means for detecting whether the roll film is present in a transfer path of the roll film, and means for controlling said transferring means, based on output signals from said position detecting means and said film detecting means.

18. The film carrier according to claim 13, further comprising means for preventing one moving member from moving from said retracting position when the other moving member is located at said use position.

19. The film carrier according to claim 13, wherein said retracting position of said first moving member is different in height from said use position.

20. An image projecting apparatus comprising:

illuminating means for illuminating a film;

a base stage having an aperture through which light from said illuminating means can pass;

optic means for projecting light passing through said aperture;

a first moving member disposed on said base stage so as to move a roll film to said aperture, said first moving member being movable between a use position and a retracting position back from said use position; and a second moving member disposed on said base stage so as to move a sheet film to said aperture, said second moving member being movable between said use position and another retracting position different in height from said retracting position.

21. The image projecting apparatus according to claim 20, wherein at the respective retracting positions said moving members are disposed so that at least parts thereof overlap vertically.

22. The image projecting apparatus according to claim 20, wherein said first moving member moves in a direction perpendicular to a transfer direction of the roll film and wherein said second moving member moves in said transfer direction and in said direction perpendicular to said transfer direction independently of said first moving member.

23. The image projecting apparatus according to claim 20, wherein said first moving member comprises supporting means for supporting first and second reels, and transferring means for transferring a roll film wound around said first reel to said second reel.

24. The image projecting apparatus according to claim 20, further comprising means for preventing one moving member from moving from said retracting position when the other moving member is located at said use position.

25. The image projecting apparatus according to claim 20, wherein said retracting position of said first moving member is different in height from said use position.

26. A film carrier comprising:

a base stage having a light path for projecting an image of a film;

a roll carrier disposed on said base stage for moving a roll film between positions within said light path and outside said light path, said roll carrier comprising a supply portion for supplying the roll film and a winding portion for winding the roll film transferred from said supply portion, said roll carrier being movable in a direction perpendicular to the transfer direction so as to move said roll film between said positions within said light path and outside said light path; and a sheet carrier disposed on said base stage for moving a sheet film between within said light path and outside said light path, said sheet carrier comprising a pair of transparent plates for holding the sheet film in a flat state, said sheet carrier being movable in the transfer direction of the roll film.

27. The film carrier according to claim 26, wherein said sheet carrier is disposed at a retracting position when moved to outside said light path and wherein said roll carrier is disposed at another retracting position different in height from said retracting position when moved to outside said light path.

28. The film carrier according to claim wherein said sheet carrier is movable in said transfer direction and in said direction perpendicular thereto independently of said roll carrier.

29. A film carrier comprising:

a base stage having a light path for projecting an image of a film;

a roll carrier disposed on said base stage, for moving a roll film between a use position in said light path and a first retracting position outside said light path, said roll carrier moving in a direction perpendicular to a transfer direction of the roll film so as to be disposed at said use position or at said first retracting position; and a sheet carrier disposed on said base stage, for moving a sheet film between said use position and a second retracting position, said sheet carrier moving in the transfer direction of the roll film so as to be disposed at said use position or at said second retracting position.

30. The film carrier according to claim 29, wherein said sheet carrier is movable in said transfer direction and in said direction perpendicular thereto independently of said roll carrier.

31. The film carrier according to claim 29, wherein said first retracting position is located at a height different from said second retracting position.

32. The film carrier according to claim 29, wherein said roll carrier comprises a supply portion for supplying the roll film, a winding portion for winding the roll film, and transferring means for transferring the roll film from said supply portion to said winding portion.

* * * * *

UNITED STATES PATENT AND TRADEMARK OFFICE
CERTIFICATE OF CORRECTION

PATENT NO. : 5,642,925
DATED : July 1, 1997
INVENTOR(S) : Yamamoto et al.

It is certified that error appears in the above-identified patent and that said Letters Patent is hereby corrected as shown below:

TITLE PAGE, ITEM [56] REFERENCES CITED:

FOREIGN PATENT DOCUMENTS, "4125623" should read --4-125623--.

COLUMN 18:

Line 26, "claim" should read --claim 26,--.

Signed and Sealed this

Fourteenth Day of April, 1998

Attest:

BRUCE LEHMAN

Attesting Officer

Commissioner of Patents and Trademarks